United States Patent
Yamauchi et al.

(10) Patent No.: US 6,809,714 B1
(45) Date of Patent: Oct. 26, 2004

(54) COLOR IMAGE PROCESSING METHOD, COLOR IMAGE PROCESSING APPARATUS, AND LIQUID-CRYSTAL DISPLAY

(75) Inventors: Kazushi Yamauchi, Yamato (JP); Masayuki Sohda, Zama (JP)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 09/634,317

(22) Filed: Aug. 8, 2000

(30) Foreign Application Priority Data

Aug. 30, 1999 (JP) ............................. 11-243586

(51) Int. Cl.$^7$ ................................. G09G 3/36
(52) U.S. Cl. ................. 345/88; 345/591; 345/593; 345/603; 348/179
(58) Field of Search ............... 345/87, 88, 89, 345/589, 591, 593, 596, 597, 604, 600, 690; 382/167; 358/516, 517, 518, 519, 521; 348/177, 178, 179, 180, 184

(56) References Cited

U.S. PATENT DOCUMENTS

| | | | | |
|---|---|---|---|---|
| 5,483,259 A | * | 1/1996 | Sachs ........................ | 345/600 |
| 5,739,809 A | * | 4/1998 | McLaughlin et al. ....... | 345/594 |
| 6,028,590 A | * | 2/2000 | Wood et al. ................ | 345/604 |
| 6,069,972 A | * | 5/2000 | Durg et al. ................. | 382/167 |

* cited by examiner

Primary Examiner—Dennis-Doon Chow
(74) Attorney, Agent, or Firm—Scully, Scott, Murphy & Presser; Robert M. Trepp, Esq.

(57) ABSTRACT

The present invention embodies high-accuracy white point adjustment with a simple circuit configuration according to an efficient algorithm in a display system for full digital processing. More particularly, the present invention is directed to a digital video interface 13 for inputting a digital video signal outputted from a host system and a liquid-crystal display monitor 11 for applying color conversion to the digital video signal inputted by the digital video interface 13 without using a look-up table, in which an adjusted-value input logic for inputting adjusted values at predetermined points to achromatic colors between maximum- and minimum-gray-scale achromatic colors and a controller LSI 22 for computing a digital video signal inputted by the digital video interface 13 so as to converge chromaticity coordinates for achromatic colors and outputting a computed digital value in a pipeline manner are used.

12 Claims, 14 Drawing Sheets

[Figure 1]
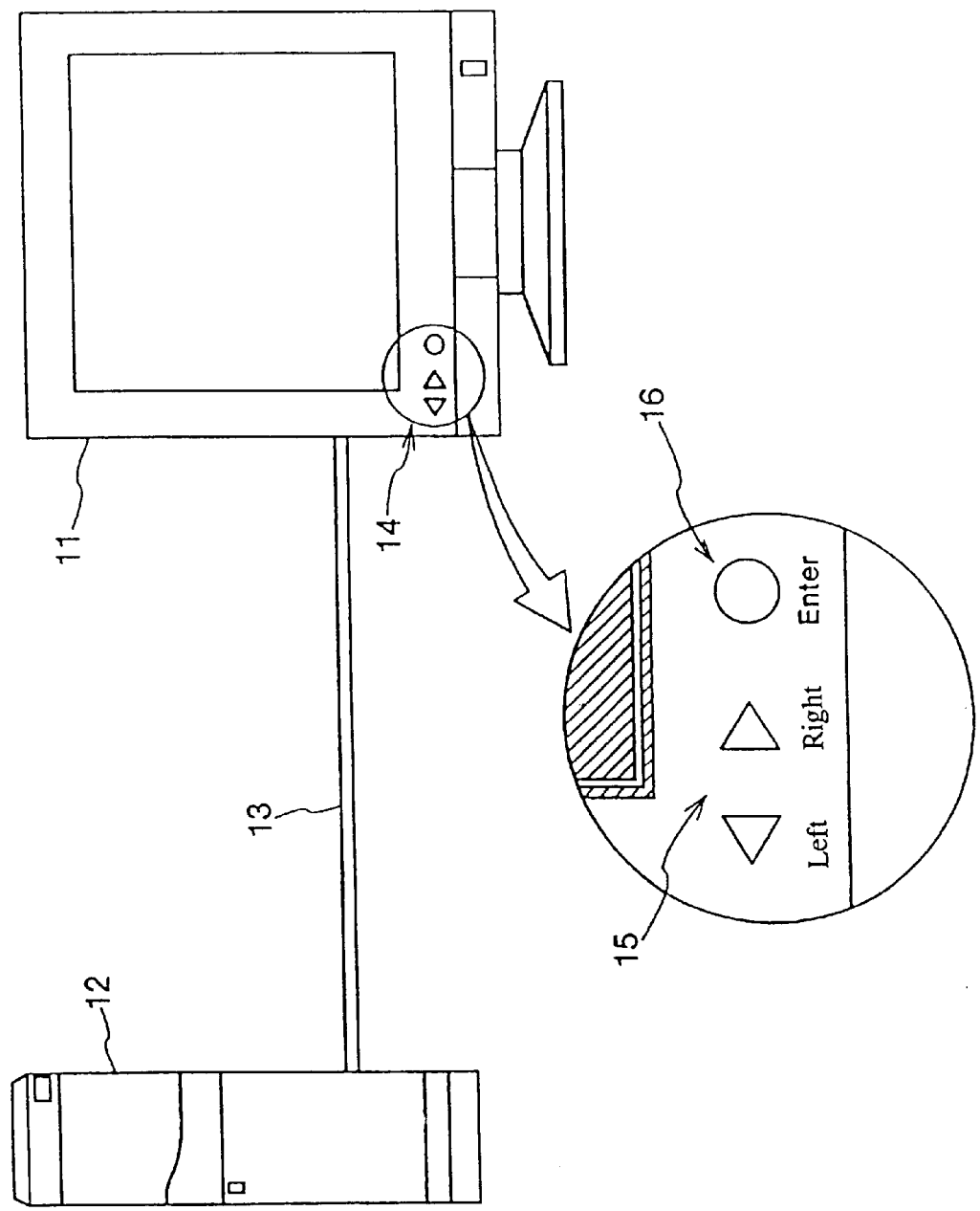

[Figure 2]
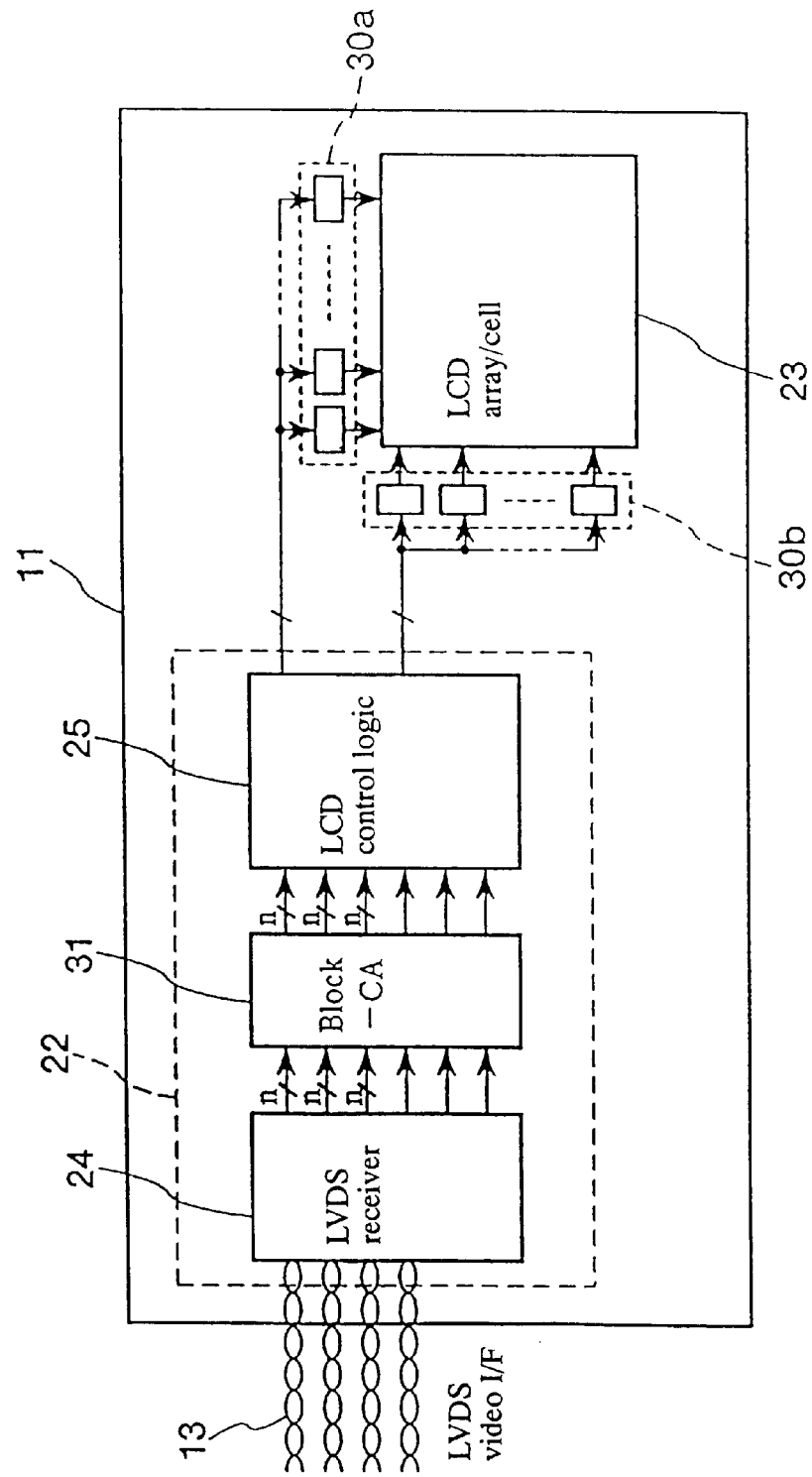

[Figure 3]
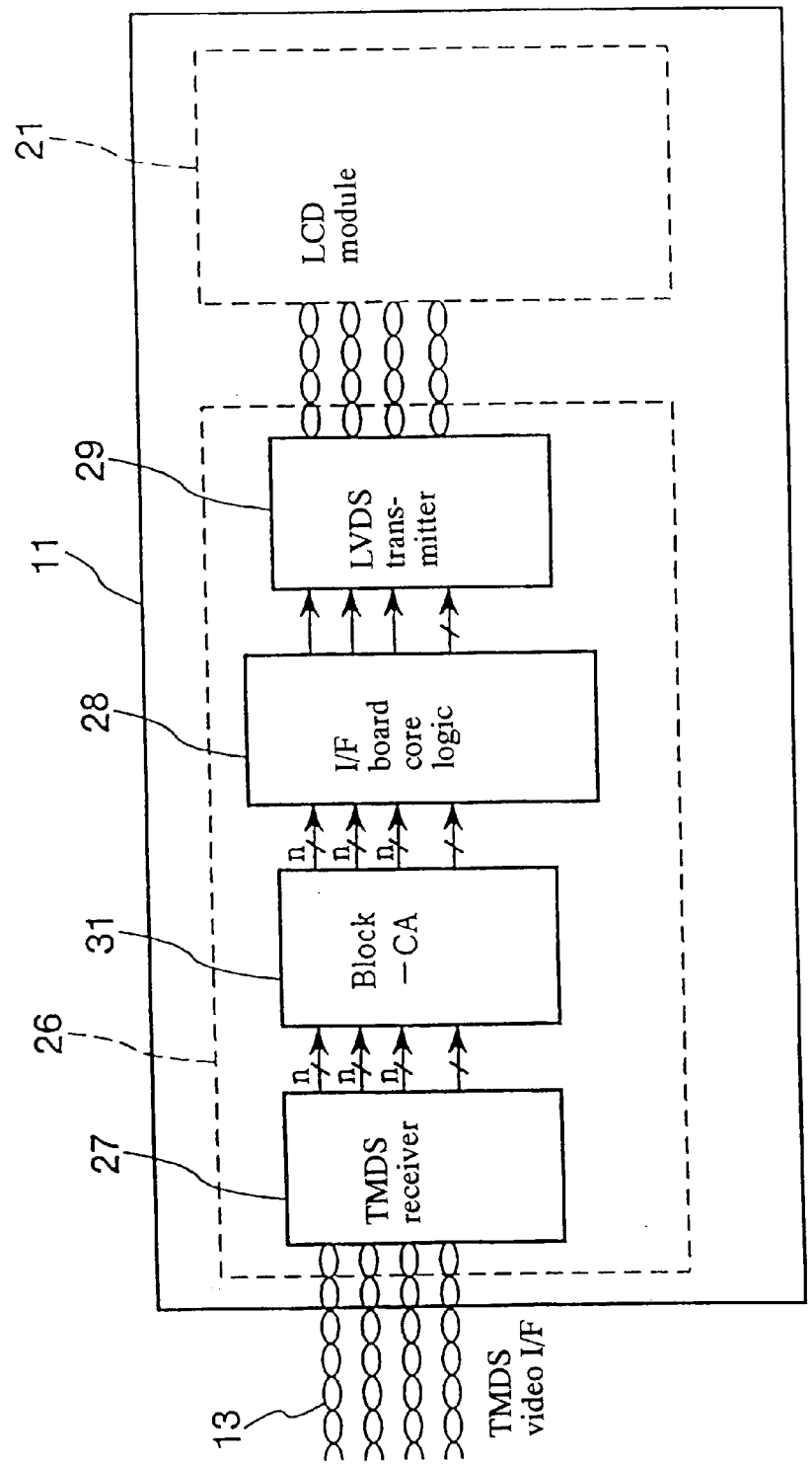

[Figure 4]
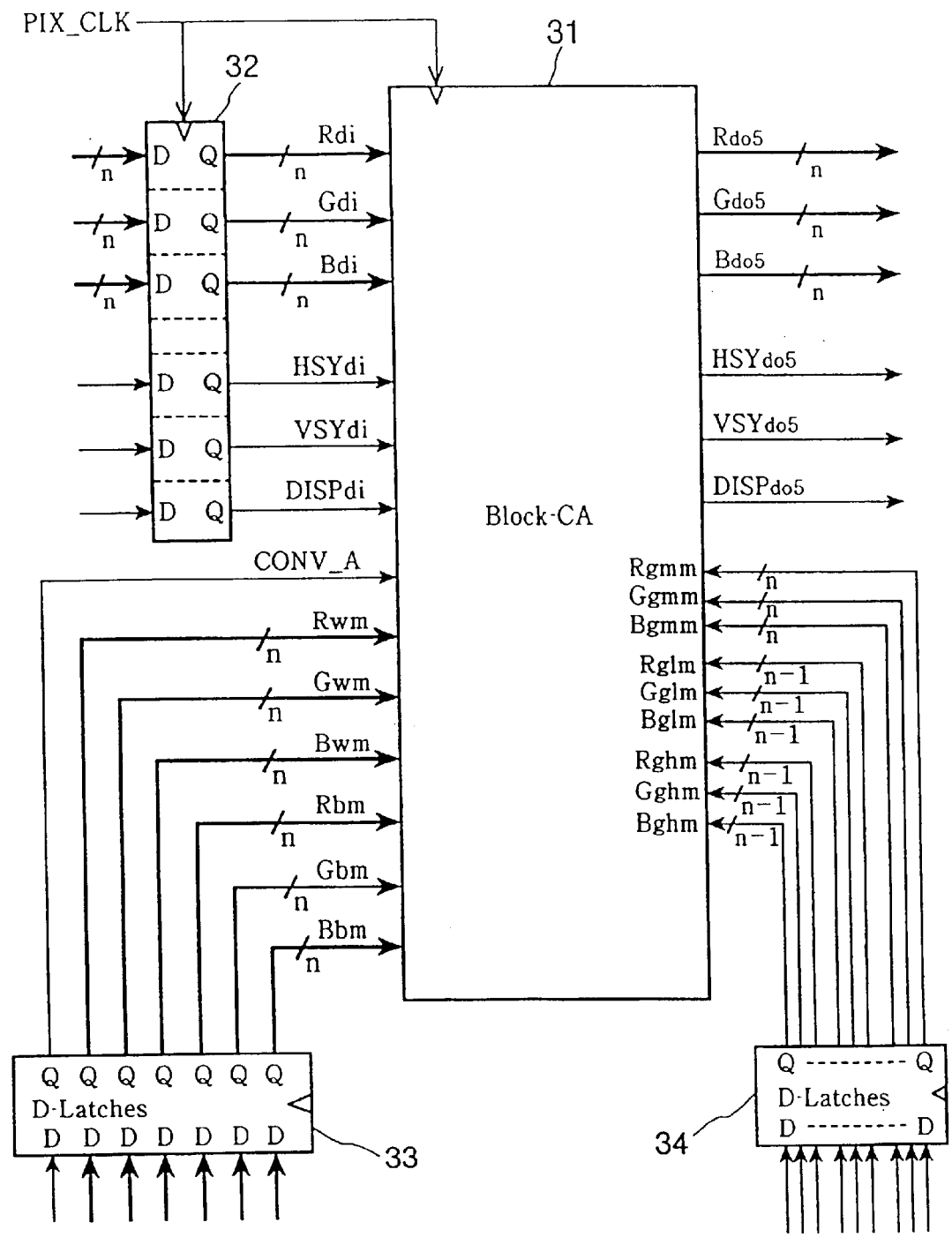

[Figure 5]
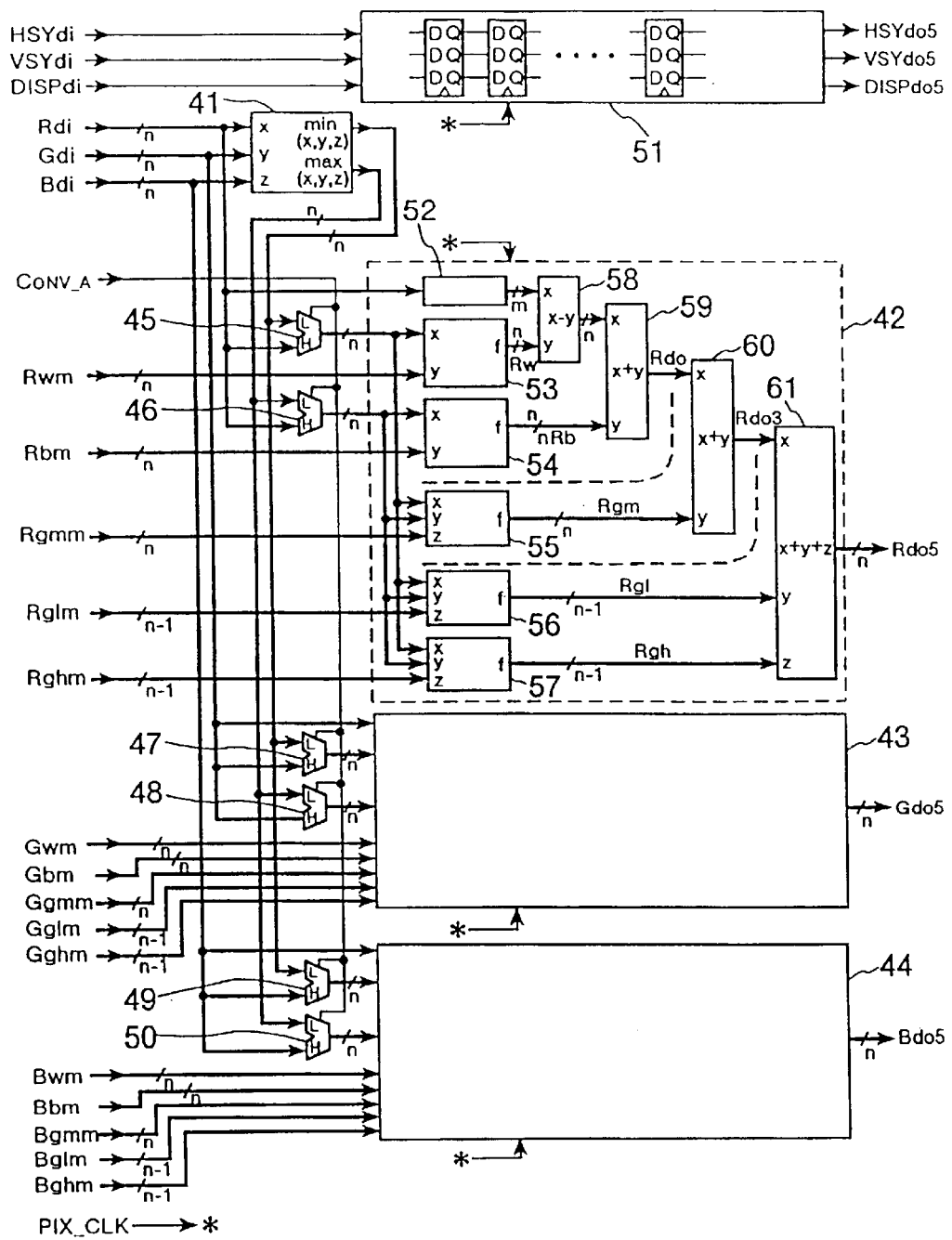

[Figure 6]
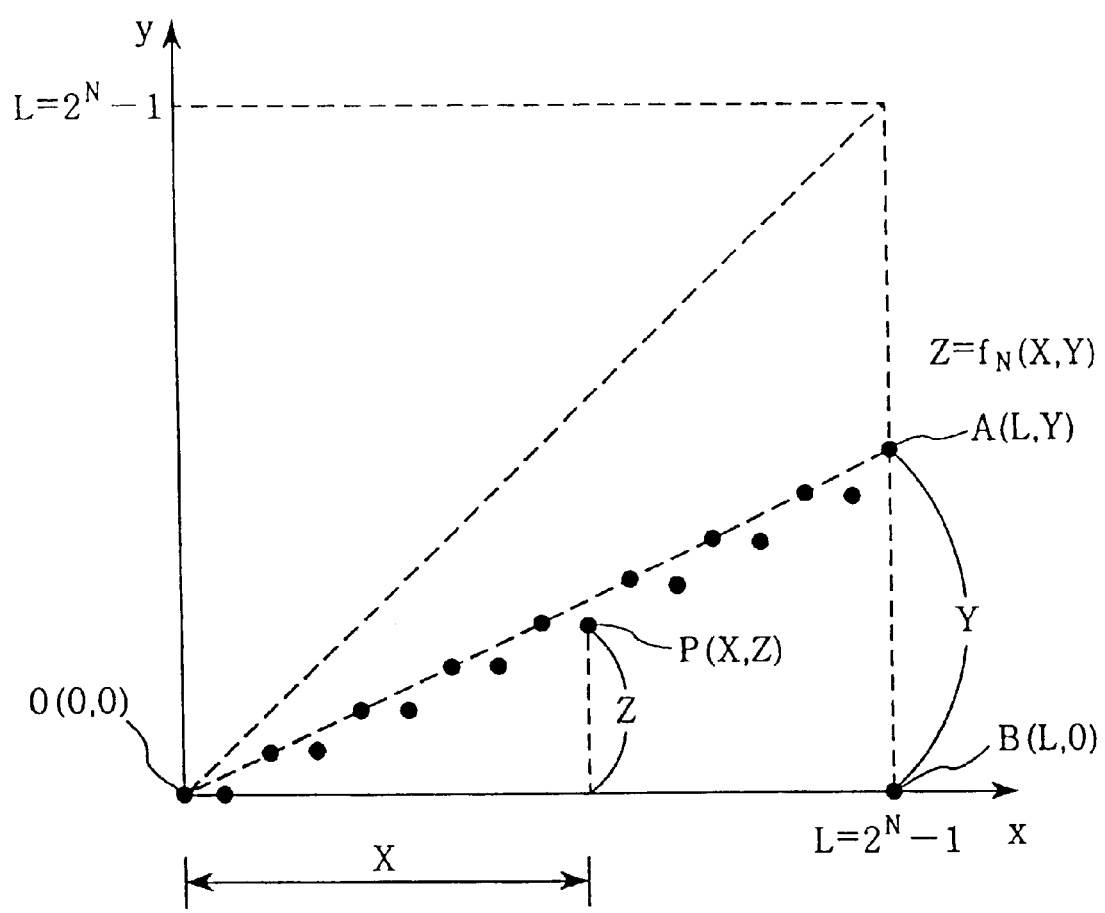

[Figure 7]
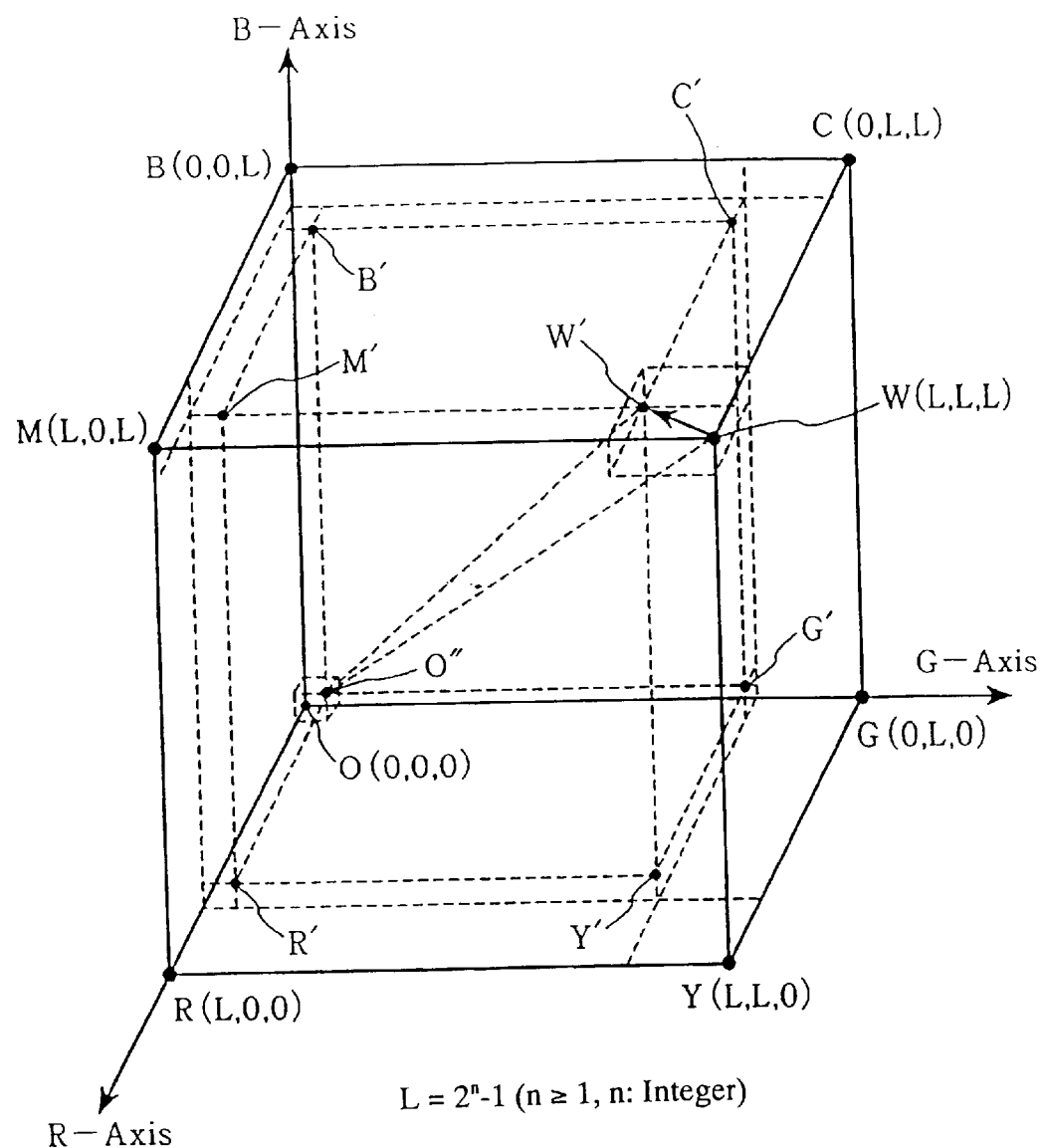
$L = 2^n - 1$ ($n \geq 1$, n: Integer)

[Figure 8]
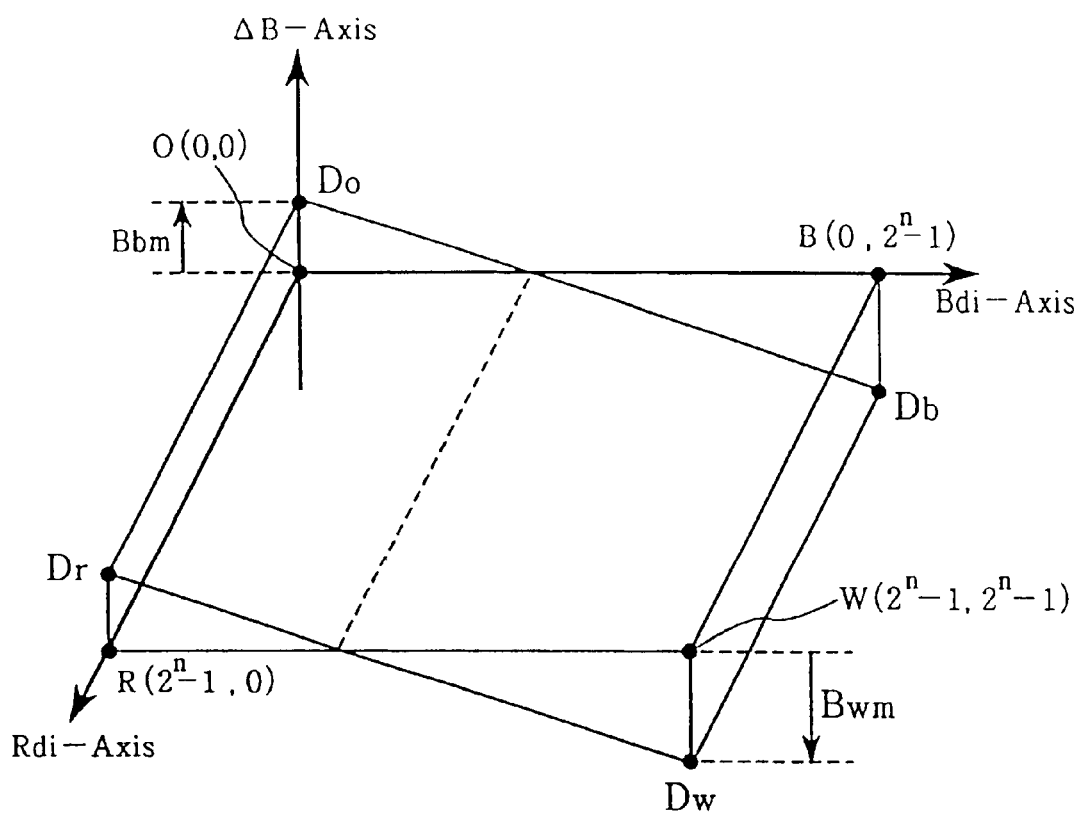

[Figure 9]
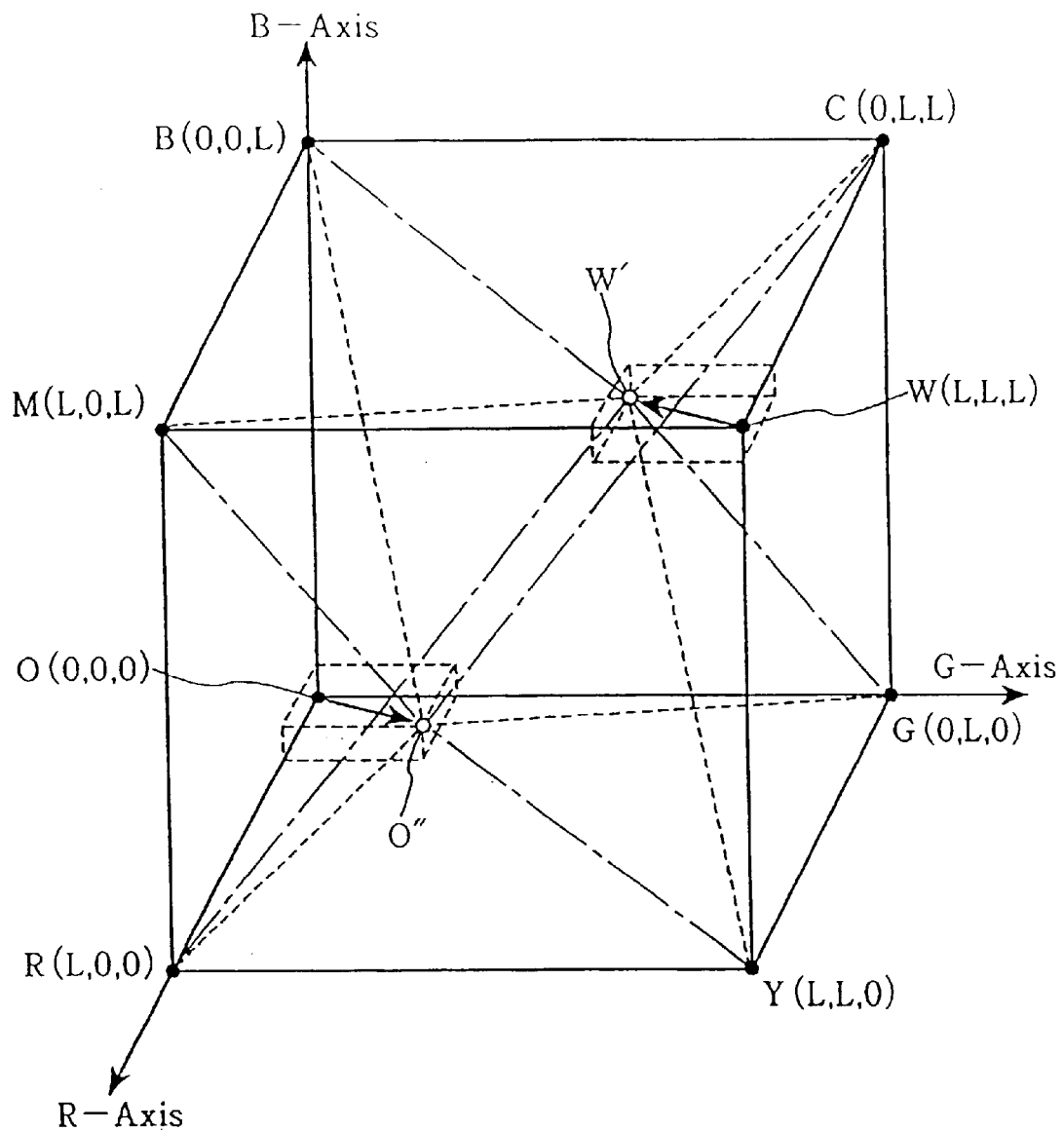
$L = 2^n-1$ ($n \geq 1$, n: Integer)

[Figure 10]
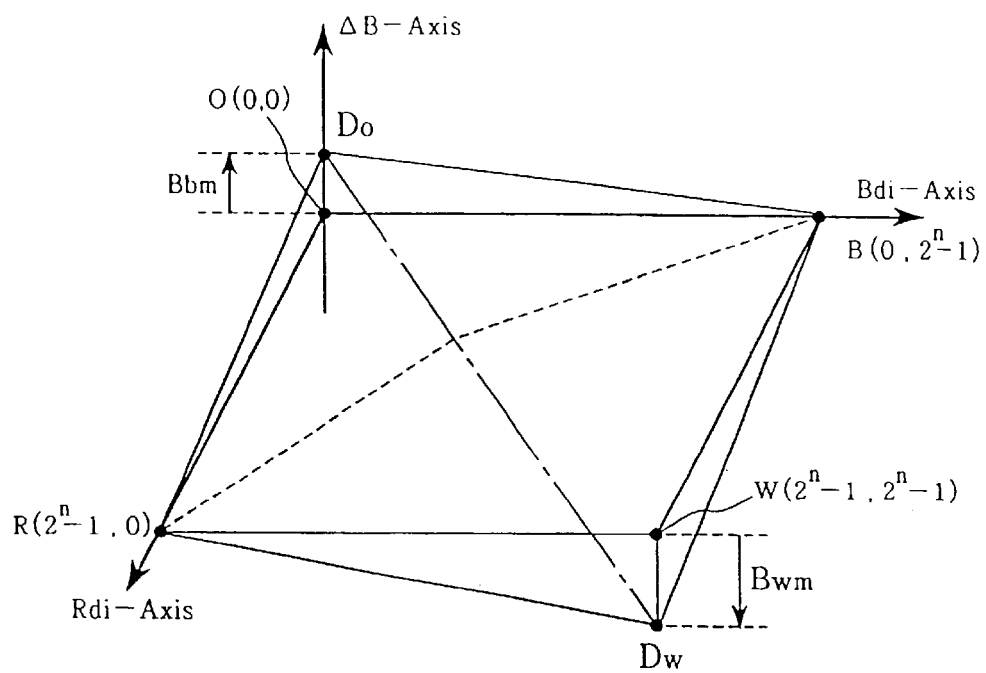
[Figure 11]
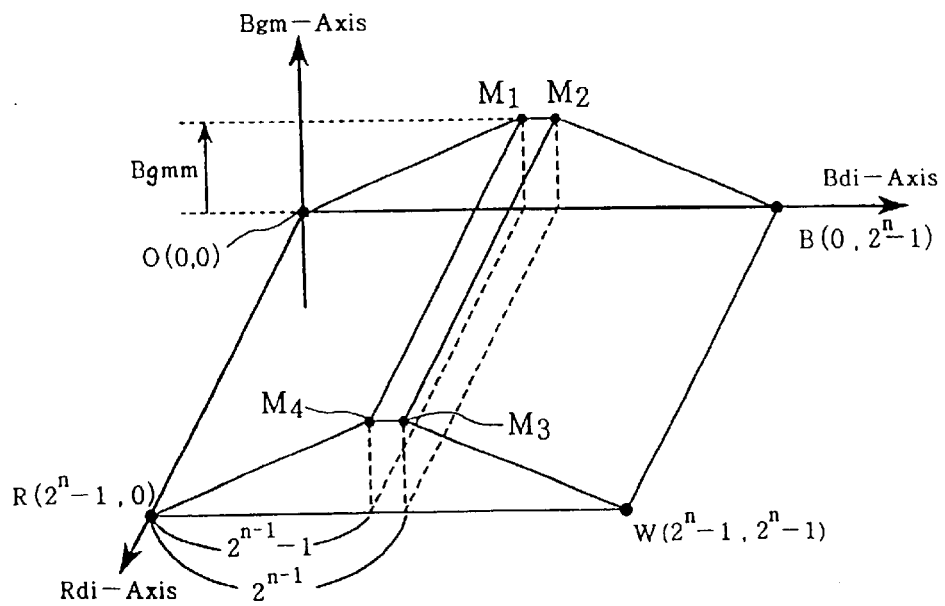

[Figure 12]
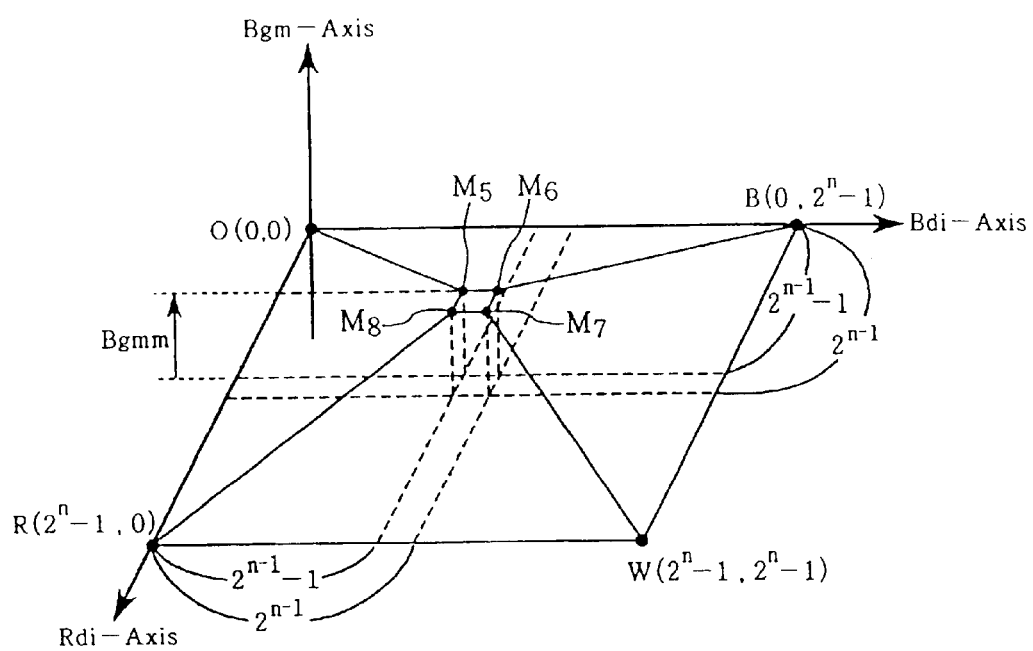

[Figure 13]
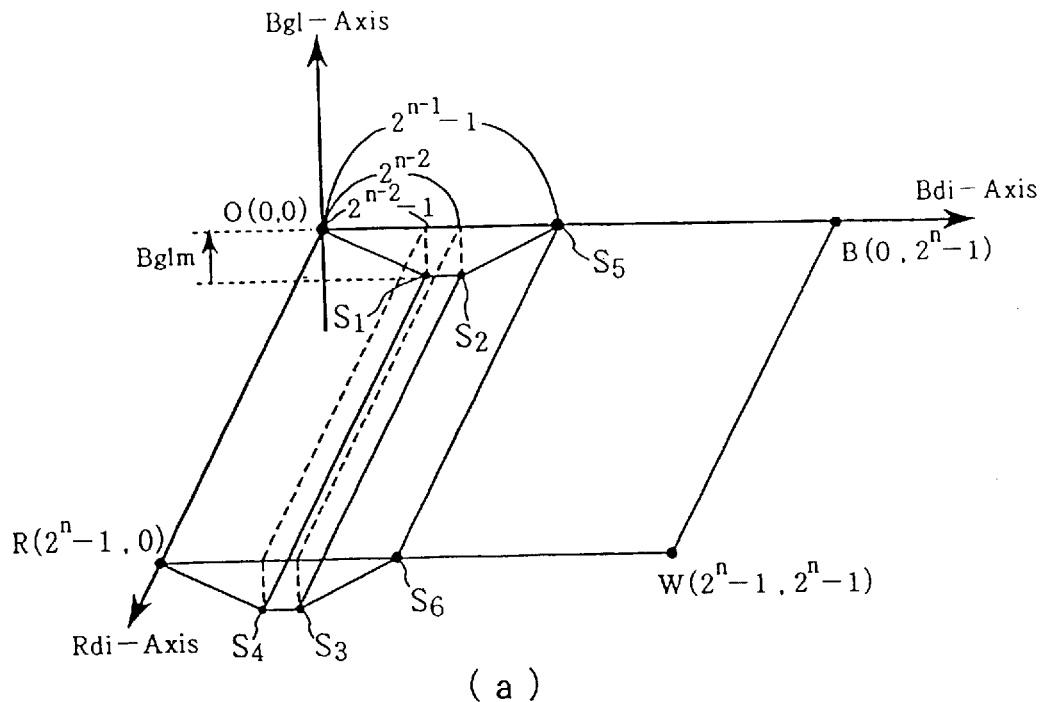
(a)
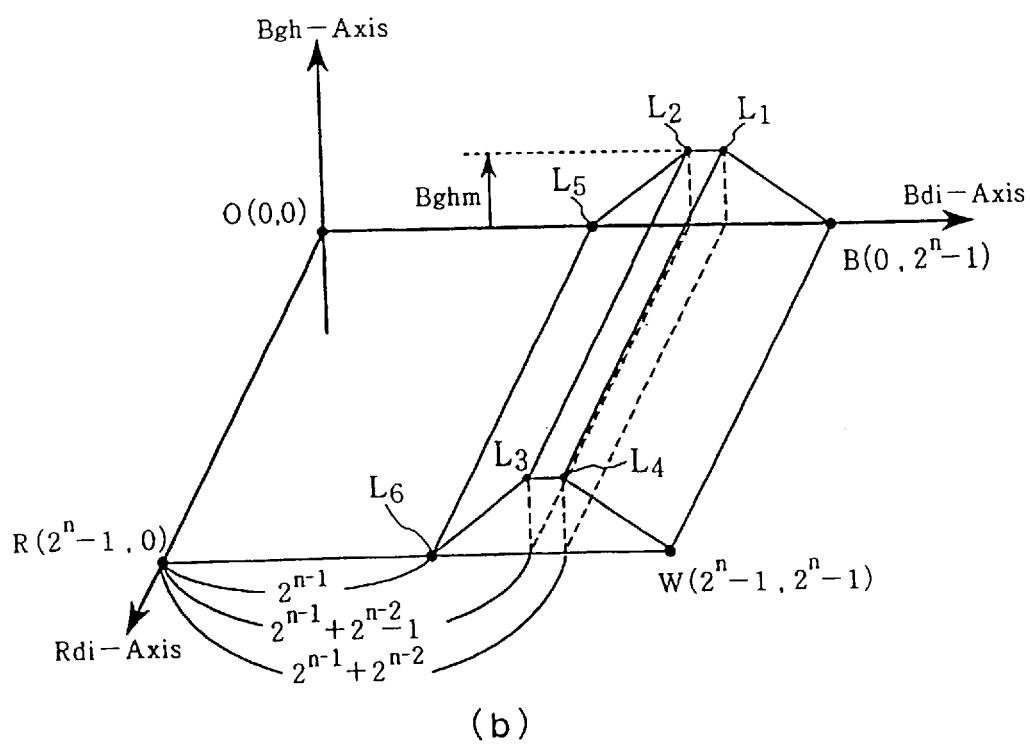
(b)

[Figure 14]
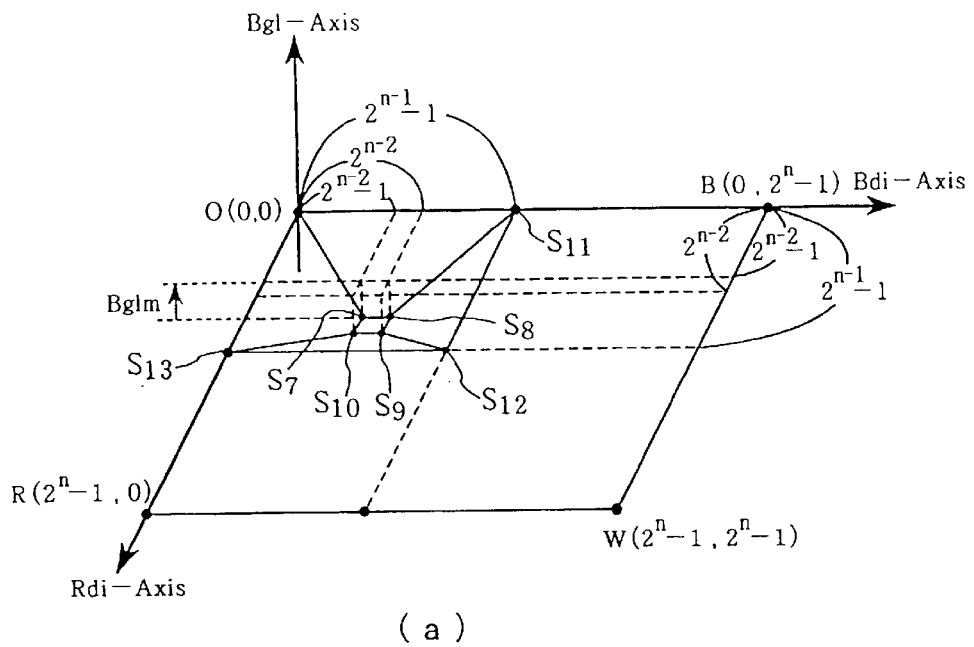
(a)
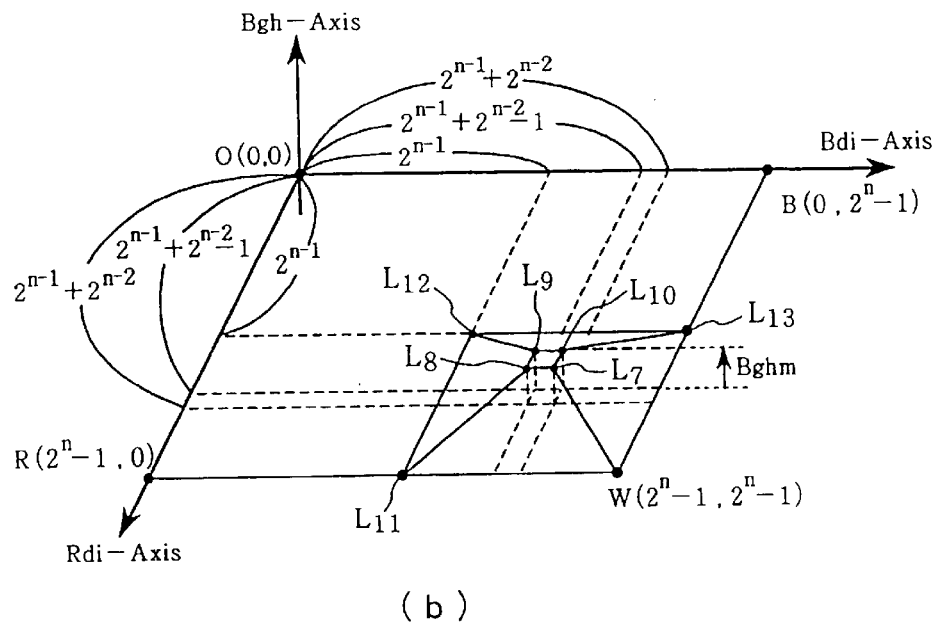
(b)

[Figure 15]
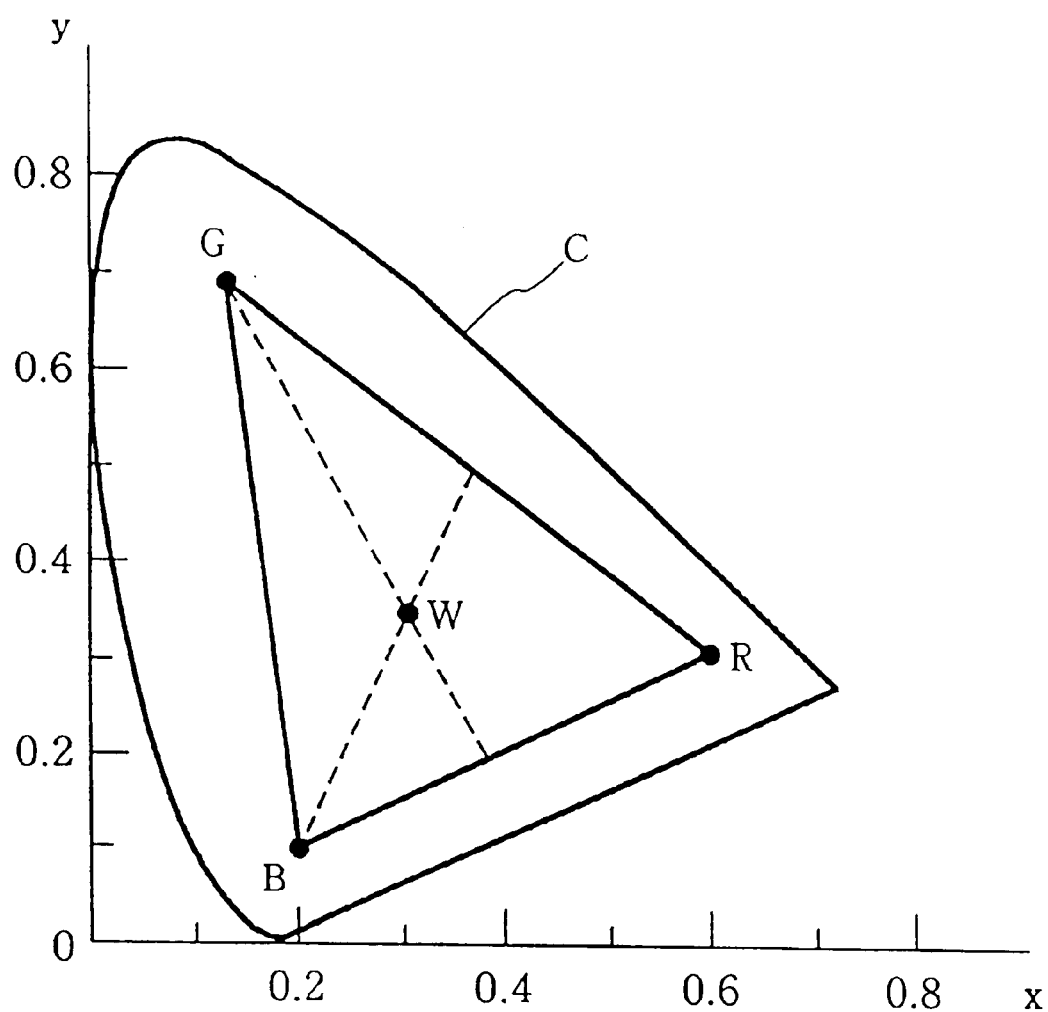

COLOR IMAGE PROCESSING METHOD, COLOR IMAGE PROCESSING APPARATUS, AND LIQUID-CRYSTAL DISPLAY

BACKGROUND OF THE INVENTION

1. Technical Field

The present invention relates to a color image processing art for a color output device, particularly to a method and an apparatus for more-accurately adjusting a white point.

2. Prior Art

In recent years, a liquid-crystal display (LCD) have been widely used as a display device for displaying images of a personal computer or television or for various monitors in addition to a CRT. In case of a color display system using the CRT or LCD, it is considered to be ideal to approach colors which can be displayed by the system as, close to natural colors as possible (this is referred to as display color fidelity). Moreover, it is requested for an apparatus using a CRT or LCD to automatically adjust a color or an operator (user) to manually adjust the color in accordance with the state of the apparatus, that is, the environment of the system such as illumination so that an optimum color can be displayed in accordance with each environment (this is referred to as color calibration). Furthermore, it is eagerly requested that the same color can be outputted independently of the type of output device (this is referred to as device transfer characteristic or color matching). These arts are generally referred to as color management. For a color display system that is a high-performance model from the next generation downward, various researches and developments are performed as indispensable technical matters. Particularly, the white point adjustment for adjusting an achromatic color tone in display is very important, which has been realized so far for a color monitor and the like.

In this case, an xy chromaticity diagram shown in FIG. 15 is used to quantitatively handle all natural colors. The diagram expresses the color tone and saturation of a color in accordance with the position of chromaticity coordinates, showing chromaticity coordinates expressed by a horizontal axis $x=X.(X+Y+Z)$ and a vertical axis $y=Y.(X+Y+Z)$, where X, Y, and Z are the three stimulus values of the XYZ color system. All colors sensed by eyes of a person are shown on and inside of the horseshoe-shaped closed curve c. Points R, G, and B in FIG. 15 are points expressing only primary display colors of R (red), G (green), and B (blue) in a specific color display system and thereby, it is possible to express all colors on sides and the inside of a triangle RGB by properly mixing R, G, and B. Moreover, maximum-luminance white can be generally obtained as a mixed color W when bringing R, G, and B into the maximum luminance, which is normally located nearby the intersection of median lines of the triangle RGB.

To design a color display system, a better white point is determined by adjusting the value of the maximum luminance at points R, G, and B or changing positions of the points R, G, and B in FIG. 15. For example, in case of a color display system using an LCD module, it is necessary to consider the spectral radiation of a backlight and a light transmittance through a color filter.

On the other hand, even in case of determining an optimum white point correspondingly to a color display system as described above, several problems occur depending on various conditions including an environmental condition because the determined value is a fixed value. Firstly, there is a problem that the color tone of white differs depending on the environmental illumination where a display is set. For example, when designing a white point at a point having a color temperature of 7000K, the point is felt bluish under an incandescent-lamp illumination at approx. 2800K or yellowish under daylight at 6500K. Secondly, there is a problem that preferable white points are changed depending on the content of a display image. For example, a desired white color differs between an application on MS-Windows and a photograph or dynamic image. Particularly, in case of a photograph image, the desired white color is influenced by the situation when the photograph was taken. Thirdly, there is a problem that the individual difference between users is large for the taste of a white color. For example, Japanese people generally tend to like bluish white. These tendencies are also influenced by an individual difference of ocular function such as an ocular disease. Fourthly, there is a problem on production. For example, in case of an LCD module, white-point producing fluctuation occurs up to approx. ±0.03 on xy chromaticity coordinates.

Therefore, it is very significant as a method for solving the above problems to configure a color display system so that a user can adjust the white point at the maximum-gray-scale achromatic color (so-called the full level white) by any method.

Moreover, as an intrinsic problem on a TFTLCD monitor, there is a phenomenon of blue shift in intermediate-gray-scale achromatic colors particularly in a low gray scale. This is a phenomenon that, when making a TFTLCD device display an achromatic color (color in which R, G, and B have the same gray scale), the color becomes more bluish as lowering the gray scale value (that is, chromaticity coordinates shift in the blue-color direction). This phenomenon becomes considerably remarkable depending on the type x of LCD panel. Though it is requested to secure a large angle of visibility for recent LCDs, the phenomenon becomes more remarkable as an angle for a user to view a display (angle of visibility) tilts from the head-on position of the display. When the phenomenon occurs, an achromatic color at an intermediate gray scale is deviated from the setting at the maximum gray scale, no matter how much the white point at the maximum gray scale can be adjusted to desirable chromaticity coordinates (color temperature). Therefore, this causes a new problem.

Though not directly related to the present invention, a prior art for white balance compensation is disclosed in Japanese Published Unexamined Patent Application No. 9-147098 and 7-336700. Japanese published Unexamined Patent Application No. 9-147098 discloses an art for applying LUT conversion to input RGB signals in accordance with the reference white value and reference black value designated by an operator. Moreover, Japanese Published Unexamined Patent Application No. 7-336700 discloses an art for A/D-converting input RGB signals into analog signals and uniforming luminances by an inverse gamma compensation circuit and a white balance compensation circuit.

A display system performing full digital processing has recently become a main stream. For example, in case of LCD display systems except some products, an LCD module uses digital data before the data is inputted to source drivers. Also, an LCD monitor having a built-in LCD module had been provided with an analog interface, performed A/D conversion inside, and transmitted a digital video signal to the LCD module. In recent years, however, some LCD monitors have appeared which are provided with a digital video interface using a low-voltage-differential-type digital data transmission system such as LVDS or TMDS {PanelLink (trademark of Silicon Image Inc.), in which a video signal uses digital data until it is inputted to source drivers after it is outputted from the graphics controller of a system unit. Moreover, in the field of notebook-type PCs, only digital data has been used so far.

When considering the above situation, a technique is required in which the processing for the above white point adjustment can be digitally performed by an efficient circuit.

Under the above background, the present applicant previously proposed an art for adjusting the maximum-gray-scale achromatic color (full white) W and the minimum-gray-scale achromatic color (full black) O to target chromaticity coordinates (W' and O') as a technique for efficiently performing white point adjustment in digital processing (Japanese Patent Application No. 97183/1999). The art is very superior in performing white point adjustment without increasing a circuit in size. However, when using only the above art, each color of the so-called intermediate-gray-scale achromatic colors located between the target chromaticity coordinates W' and O' are automatically converted to a color expressed by an integer lattice point approximated by a line segment W'O'. This is, so to say, approximation by two points of W' and O' and a case may occur in which each color of the converted intermediate-gray-scale achromatic color is further deviated from target chromaticity coordinates as the color further separates from an approximation point such as a W' or O'. For example, when adjusting full white and full black so that they have a color temperature (e.g. 5400K) at which they seem to be the most achromatic under the environment, a phenomenon may appear that ¼ gray automatically converted due to the adjustment becomes bluish but ¾ gray becomes yellowish. This phenomenon remarkably occurs particularly in a display device using a TFTLCD.

To solve these left problems, it is permitted to increase the number of approximation points and adjust a plurality of achromatic colors other than full white and full black to target chromaticity coordinates, that is, apply the so-called multiple-point approximation to the achromatic colors. However, even if the multiple-point approximation is merely executed, it is performed through conversion of digital R, G, and B values. Therefore, it is necessary to use an efficient conversion algorithm for preventing a logic volume under execution from extremely increasing.

Moreover, conversion in which luminance levels of three primary colors (red, green, and blue) and yellow, magenta, and cyan are not influenced (not attenuated) even if full white adjustment or full black adjustment is performed is effective to keep the number of colors which can be displayed and make the most use of multiple gray scale in accordance with n-bit colors. Moreover, it is preferable that the above conversion can be executed even when executing multiple-point approximation.

Therefore, it is an object of the present invention to realize high-accuracy white point adjustment in which achromatic colors between maximum and minimum gray scales are brought into almost the same chromaticity coordinates by approximating the white point adjustment also for intermediate-gray-scale achromatic colors other than full white and full black in a display system for full digital processing.

It is another object of the present invention to embody; high-accuracy white point adjustment by a simple circuit configuration according to an efficient algorithm in a display system for full digital processing.

It is still another object of the present invention to embody high-accuracy white point adjustment according to multiple-point approximation and perform conversion in which luminance levels of three primary colors (red, green, and blue) and yellow, cyan, and magenta are not influenced (not attenuated) even after the above adjustment.

SUMMARY OF THE INVENTION

To solve the above technical problems, a color image processing method of the present invention comprises the, steps of converting an intermediate gray scale input color serving as an achromatic color located between maximum- and minimum-gray-scale achromatic colors into a color having a different color tone according to the converted value being set and slowly decreasing a converted value for input colors other than the intermediate gray scale input color and decreasing the converted value to 0 for an input color in which the value of each color signal configuring the input color is equal to the minimum gray scale value or maximum gray scale value.

Moreover, in addition to the above, the present invention comprises the steps of converting an input color serving as a maximum-gray-scale achromatic color into a color having a different color tone in accordance with a set maximum-gray-scale converted value, slowly decreasing a converted value for input colors other than the input color, decreasing the converted value to 0 for an input color in which the value of each color signal configuring the input color is equal to the minimum gray scale value, converting an input color serving as a minimum-gray-scale achromatic color into a-color having a different color tone in accordance with a set minimum-gray-scale converted value, slowly decreasing a converted value for input colors other than the input color, and decreasing the converted value to 0 for an input color in which the value of each color signal configuring the input color is equal to the maximum gray scale value. Thereby, the present invention is superior in that it is possible to use a conversion system (conversion A) in which three primary colors (red, green, and blue) and yellow, cyan, and magenta are uniformly converted even if white point adjustment is executed for the maximum-gray-scale achromatic color and minimum-gray-scale achromatic color in addition to white point adjustment for an achromatic color whose gray scale value is located intermediately between the maximum- and minimum-gray-scale achromatic colors, and it is possible to express a color closer to reality even for a case of displaying an image using the Dither method.

In this case, a set converted value denotes a parameters for adjustment set by a user. In case of three-point approximation, set converted values include not only a maximum-gray-scale achromatic color point ($GL[2^n-1]$) and: a minimum-gray-scale achromatic color point ($GL[0]$) but, also a fine-adjusted value at a point ($GL[2^{n-1}-1]$) located between them. Moreover, in case of five-point approximation, set converted values include fine-adjusted values at $GL[2^{n-2}-1]$ and $GL[2^{n-1}+2^{n-2}-1]$ in addition to adjustment points for three-point approximation. That is, it is preferable to compensate a white point at the achromatic color of an intermediate gray scale point in powers of 2 because adjustment can be executed in real time while a circuit scale is decreased. The adjustment method by a user can be applied to any purpose such as pop-up of an adjusted value every RGB signal by an on-screen display (OSD) mechanism, direct input of parameters for adjustment as value, or using of adjusted values applied to an image selected by a user in accordance with the comparison method as an adjusted value by displaying a plurality of images (e.g. two images) for white point adjustment at the achromatic color of a specific gray scale point.

Moreover, it is possible to apply an input color to an input color signal generated by a display system such as XYZ display system, or YMCK display system, as well as RGB display system.

Furthermore, a color image processing method of the present invention comprises the steps of converting an intermediate gray scale input color serving as an achromatic color located between maximum- and minimum-gray-scale achromatic colors into a color having a different color tone and slowly decreasing a converted value for input colors other than the intermediate grays scale input color and decreasing the converted value to 0 for an input color in which the value of any one of color signals configuring the input color is equal to the minimum gray scale value or maximum gray scale value.

According to the above invention, it is possible to realize a conversion system (conversion B) in which luminance levels of three primary colors (red, green, and blue) and yellow, cyan, and magenta are not influenced (not attenuated) after applying white point adjustment to an achromatic color whose gray scale value is located intermediately between the maximum- and minimum-gray-scale achromatic colors.

In this case, when this invention is characterized by converting an input color serving as a maximum-gray-scale achromatic color into a color having a different color tone in accordance with a set maximum-gray-scale converted value, slowly decreasing a converted value for input colors other than the above input color, and decreasing the converted value to 0 for an input color in which the value of any one of color signals configuring the input color is equal to the minimum gray scale value, or by converting an input color serving as a minimum-gray-scale achromatic color into a color having a different color tone in accordance with a set minimum-gray-scale converted value, slowly decreasing a converted value for input colors other than the above input color, and decreasing the converted value to 0 for an input color in which the value of any one of color signals configuring the input color is equal to the maximum gray scale value, it is possible to also apply white point adjustment to the achromatic color of the minimum- or maximum-gray-scale value in addition to the adjustment of an achromatic-color whose gray scale value is located intermediately and realize white point adjustment according to multiple-point approximation by the conversion method using the above conversion B.

It is needless to say that the conversion method using the conversion B can be applied to the content of a set converted value similarly to the case of the conversion method using the above conversion A.

Moreover, a color image processing apparatus of the present invention for applying white point adjustment to input colors in which each color signal is configured bye n bits (n is a natural number equal to or larger than 2) comprises a converted-value input logic for inputting a converted value for an achromatic input color whose gray, scale level is equal to $2^{n-k}$ or $2^{n-k}-1$ (k is an integer meeting a range of 1£k<n) and a converter converting the achromatic input colors whose gray scale levels are equal to $2^{n-k}$ and $2^{n-k}-1$ into colors having different color tones in accordance with a converted value input by the converted-value input logic, slowly decreasing a converted value for input colors other than the input colors having the achromatic color gray scale levels of $2^{n-k}$ and $2^{n-k}-1$, and decreasing a converted value to 0 for an input color in which the value of each color signal configuring the input color is equal to the minimum gray scale value or an input color in which the gray scale level of its color signal is equal to or more than $2^{n-k+1}-1$ According to the above invention, it is possible to realize white point adjustment for an intermediate-gray-scale achromatic color located nearby the minimum-gray-scale achromatic color, use the conversion method using the conversion A, and properly compensate a blue shift in a low-grayscale part even if an image is displayed using the Dither method.

Furthermore, a color image processing apparatus of the present invention for applying white point adjustment to input colors in which each color signal is configured by n bits (n is a natural number equal to or larger than 2) comprises a converted-value input logic for inputting a converted value for an achromatic input color whose gray scale level is equal to $2^{n-k}$ or $2^{n-k}-1$ (k is an integer meeting a range of 1£k<n) and a converter for converting the achromatic input colors whose gray scale levels are equal to $2^{n-k}$ and $2^{n-k}-1$ into colors having different color tones in accordance with a converted value input by the converted-value input logic, slowly decreasing a converted value for input colors other than the input colors having the achromatic color gray scale levels of $2^{n-k}$ and $2^{n-k}-1$, and decreasing a converted value to 0 for an input color in which the value of any one of color signals configuring the input color is equal to the minimum gray scale value or an input color in which the gray scale level of its color signal is equal to or more than $2^{n-k+1}-1$. According to the above invention, it is possible to realize white point adjustment for an intermediate-gray-scale achromatic color located nearby the minimum-gray-scale achromatic color, use the conversion method using the conversion B, and improve a blue shift in a low-gray-scale achromatic color part while luminance levels of three primary colors (red, green, and blue) and yellow, cyan, and magenta are not attenuated even after white point adjustment.

Converted-value input logics of these inventions include not only a configuration allowing a converted value to be directly inputted so that a user can input a numerical value or determine an adjusted value in accordance with, the selection of an adjusted image according to the comparison method, but also a configuration allowing an adjusted-value (converted-value) formed by other systems to be inputted through the Internet or the like. Moreover, a slowly-decreasing converted value can be understood as a converted value whose absolute value slowly decreases independently of whether it is positive or negative.

Furthermore, from other viewpoint, it can be also said that the present invention is a color image processing apparatus for applying color conversion to a digital video interface for inputting a digital video signal outputted from a host system and a digital video signal input through the digital video interface without using a look-up table, comprising an adjusted-value input logic for inputting adjusted values at a predetermined point to achromatic colors ranging from the maximum-gray-scale achromatic color to the minimum-gray-scale achromatic color and an output logic for computing a digital video signal input by the digital video interface so as to converge chromaticity coordinates in achromatic colors in accordance with adjusted values input by the adjusted-value input logic and outputting a computed digital value in a pipeline manner.

In this case, the adjusted-value input logic is preferable in that it is possible to apply white point adjustment to maximum- and/or minimum-gray-scale achromatic color(s) in accordance with digital data because the unit is characterized by inputting an adjusted value at the point of the maximum- and/or minimum-gray-scale achromatic color(s).

Moreover, the unit is superior in that it is possible to execute white. point adjustment by a simple circuit in real time by outputting a computed digital value in a pipeline manner.

Furthermore, the present invention realizes adjustment by an efficient algorithm according to multiple-point approximation without using a look-up table (LUT). Therefore, it is unnecessary to use an LUT for each target to be adjusted differently from a conventional case and it is possible to realize white point adjustment by a simple circuit configuration.

Furthermore, the adjusted-value input logic is preferable in that it is possible to embody high-accuracy white point adjustment according to multiple-point approximation by a simple circuit configuration because the unit is characterized by inputting an adjusted value at the achromatic-color point at a gray scale level specified in powers of 2 between maximum- and minimum-gray-scale achromatic colors. Moreover, by executing the above multiple-point approximation, it is possible to make white point adjustment even slightly approach ideal white point adjustment in which chromaticity coordinates do not shift over achromatic colors ranging from the maximum gray scale to the minimum gray scale.

Furthermore, the present invention is a liquid-crystal display for displaying an image in accordance with a digital video interface for inputting a digital video signal outputted from a host system and a digital video signal input by the digital video interface, comprising an adjusted-value input logic for inputting an adjusted value at a white point for a digital video signals inputted by the digital video interface, a controller for computing a digital video signal inputted by the digital video interface so as to converge chromaticity coordinates in achromatic colors without using a look-up table and outputting a computed digital value in a pipeline manner in accordance with the adjusted value inputted by the adjusted-value input logic, and a liquid-crystal display section for displaying an image in accordance with a digital value outputted from the controller.

Furthermore, the adjusted-value input logic inputs adjusted values for a white point at a plurality of achromatic color gray-scale levels and outputs results computed so as to adjust a blue shift in a low-gray-scale achromatic color in accordance with the adjusted values inputted by the adjusted-value input logic. More specifically, the adjusted values for a white point at a plurality of achromatic color gray scale levels inputted by the adjusted-value input logic are inputted at intermediate-gray-scale achromatic color gray scale levels between maximum- and minimum-gray-scale achromatic colors. Thereby, it is possible to almost keep the set temperature value by preferred color temperature adjustment at the maximum-gray-scale white point, also in an intermediate gray scale and correct a trouble in white point adjustment intrinsic to a liquid-crystal display.

Moreover, in case of the invention of a color-image processing method, it is possible to add a method for changing conversion methods of the above conversion A and conversion B. Furthermore, in case of the inventions of a color-image processing apparatus and a liquid-crystal display, it is possible to further include a changer for changing the conversion methods of the above conversions A and B. By adding these components, it is possible to use a proper conversion method in accordance with the type of image or the structure of an image-processing system and obtain an optimum output in accordance with user's taste or status of image.

BRIEF DESCRIPTION OF THE DRAWINGS

Preferred embodiments of the present invention will now be described, by way of example only, with reference to the accompanying drawings in which:

FIG. 1 is an illustration for explaining the entire configuration of color display system to which the color image processing apparatus of the present embodiment is applied;

FIG. 2 is a block diagram when assuming an LCD module comprising an LVDS video interface;

FIG. 3 is a block diagram when assuming a case of inputting a digital video signal from a TMDS video interface;

FIG. 4 is an illustration for explaining the entire configuration of the conversion block of digital color data of the present embodiment;

FIG. 5 is an illustration showing a logic block diagram of the present embodiment;

FIG. 6 is an illustration of the core calculation function of the present embodiment;

FIG. 7 is an illustration for explaining the white point adjustment at two points of the maximum gray scale and minimum gray scale in the conversion A;

FIG. 8 is an illustration for obtaining as a graphical image how the converted value of B, DB=Bdo−Bdi is changed through the conversion A;

FIG. 9 is an illustration for explaining the white point adjustment at two points of the maxim and minimum gray scales in the conversion B;

FIG. 10 is an illustration for obtaining as a graphical image how the converted value of B, DB=Bdo−Bdi is changed through the conversion B;

FIG. 11 is an illustration for explaining as a graphical image how Bgm, a fine-adjusted value of B, is changed through the conversion A;

FIG. 12 is an illustration for obtaining as a graphical image how Bgm, a fine-adjusted value of B, is changed through the conversion B;

FIGS. 13(a) and 13(b) are illustrations for obtaining as graphical images how Bgl and Bgh, fine-adjusted values of B, are changed through the conversion A;

FIGS. 14(a) and 14(b) are illustrations for obtaining as a graphical images how Bgl and Bgh, fine-adjusted values of B, are changed through the conversion B; and, FIG. 15 is an xy chromaticity diagram for explaining the prior art of the present invention.

DETAILED DESCRIPTION OF THE PREFERRED EMBODIMENTS OF THE INVENTION

The present invention will be described below in detail in accordance with the embodiments shown in the accompanying drawings.

FIG. 1 is an illustration for explaining the entire configuration of a color display system to which the color-image processing apparatus of this embodiment is applied. Symbol 11 denotes a liquid-crystal display monitor (LCD monitor) which is provided with, for example, an LCD module comprising a thin-film transistor (TFT) structure and an interface (I/F) board connected with a digital interface to supply a digital video signal to the LCD module. Moreover, symbol 12 denotes a personal computer (PC) which outputs a video signal to the LCD monitor 11 from a CPU. Furthermore, symbol 13 denotes a digital video interface. In case of a conventional display system, a process is executed in which a digital signal output from a PC is temporarily converted into an analog signal and returned to a digital signal again to display it. In this case, however, it is difficult to fully derive the original performance of a liquid-crystal display digitally driven. Therefore, this embodiment uses a digital transmission method such as LVDS (Low Voltage Differential Signaling) or TMDS (Transition Minimized Differential Signaling) to make it possible to output an image to the LCD monitor 11 through the digital video interface 13.

In case of this embodiment, the LCD monitor 11 is provided with input switches 14. The input switches 14 are provided with right and left switches 15 and an enter key 16 so that an adjusted value (converted value) for performing white point adjustment can be inputted. For example, it is possible to pop up an adjusted value by an on-screen display (OSD) mechanism, more specifically to input an adjusted value for attenuating an R, G, or B color signal by using the right and left switches 15 and the enter key 16 at each gray scale such as pure white, pure black, ½ gray, or ¼ gray. Further specifically, moreover, it is possible to use a comparison method, more specifically, to configure a structure so as to display two screens, make a user select which seems to be white by using the right and left switches 15 and the enter key 16, and determine a converted value in accordance with the selected screen.

FIG. 2 is a block diagram when assuming an LCD module comprising an LVDS video interface as a color display system. The structure is used for a notebook-type PC. In this case, an I/F board is unnecessary. In FIG. 2, a digital video interface 13 functions as an LVDS video interface and transfers a digital video signal to an LVDS receiver 24 built in a controller LSI 22. The LVDS receiver 24 outputs R, G, and B signals to a conversion block 31. The conversion block 31 executes the white point adjustment to be described later and outputs converted R, G, and B signals to a control logic 25. An output of the control logic 25 is inputted to a source driver 30$a$ and a gate driver 30$b$ and displayed by an LCD array/cell 23.

FIG. 3 is a block diagram when assuming that a digital video signal inputted through a digital transmission system comprising a TMDS video interface serving as a color display system is outputted to the LCD module with an LVDS I/F. In FIG. 3, the digital video interface 13 functions as a TMDS video interface and transfers a digital video signal to the TMDS receiver 27 of an I/F board 26. The TMDS receiver 27 outputs R, G, and B signals to the conversion block 31. The conversion block 31 executes the white point adjustment to be described later and outputs converted R, G, and B signals to the core logic 28 of the I/F board 26. An output of the core logic 28 is converted into an LVDS transmission type by an LVDS transmitter 29 and inputted to an LCD module 21 comprising an LVDS I/F and displayed. The LCD module 21 includes the components described for FIG. 2.

FIG. 4 is an illustration for explaining the entire configuration of a digital color data conversion block serving as the core of white point adjustment.

In FIG. 4, Rdi, Gdi, and Bdi outputted from a D-latch 32 to a conversion block (Block-CA) 31 transfer the color data for each of sub-pixels (red, green, and blue) successively sent from a host system such as PC 12 synchronously with a pixel clock (PIX_CLK) and serve as input bus signals to the conversion block 31. Moreover, HSYdi, VSYdi, and DISPdi are horizontal-synch, vertical-synch, and display-timing signals sent from the host system.

Moreover, various adjusted values used for the white point adjustment to be described later are outputted from a D-latch 33 and a D-latch 34 in accordance with the setting from the outside of a system by a user to the conversion block 31. Rwm, Gwm, and Bwm outputted from the D-latch 33 are user-set parameters (n bits) for designating R, G, and B values reduced through this conversion at $GL[2^n-1]$ which is the maximum gray scale achromatic color. Furthermore, Rbm, Gbm, and Bbm are user-set parameters (n bits) for designating R, G, and B; values increased through this conversion at $GL[0]$ which is the minimum gray scale achromatic color.

Furthermore, Rgmm, Ggmm, and Bgmm outputted from the D-latch 34 are user-set parameters for designating a fine-adjusted value added at $GL[2^{n-1}-1]$ which is approx. ½ gray between maximum- and minimum-gray-scale achromatic colors for approximation of the third point to be described later. Moreover, Rglm, Gglm and Bglm are user-set parameters for designating a fine-adjusted value added at $GL[2^{n-2}-1]$ which is approx. ¼ gray for approximation of the fourth point to be described later. Furthermore, Rghm, Gghm, and Bghm are user-set parameters for designating a fine-adjusted value added at $GL[2^{n-1}+2^{n-2}-1]$ which is approx. ¾ gray for approximation of the fifth point to be described later.

In this case, CONV_A input to the conversion block 31 is a setting input for designating which to select, the above conversions A or B and is configured so that the conversion A is selected for CONV_A="High".

FIG. 5 is an illustration showing a logic block diagram of the conversion block 31. In FIG. 5, symbol 41 denotes a block for receiving video data signals (Rdi, Gdi, and Bdi) inputted synchronously with a pixel clock (PIX_CLK) and selecting and outputting the minimum value. min(Rdi, Gdi, Bdi) of the signals and the maximum value max(Rdi, Gdi, Bdi) of them. Moreover, symbols 42, 43, and 44 denote blocks for obtaining values (Rdo5, Gdo5, and Bdo5) converted through five-point approximation in R, G, and B color signals.

In this case, symbols 45 and 46 denote multiplexers (MUXS) and the MUX 45 is configured so as to select and output Rdi when the conversion A is designated by setting CONV_A="High" and select and output min(Rid, Gdi, Bdi) when the conversion B is designated by setting CONV_A= "Low". Furthermore, MUX 46 is configured so as to select and output Rdi when the conversion A is designated by setting CONV_A ="High" and select and output max(Rdi, Gdi, Bdi) when the conversion B is designated by setting CONV_A ="Low". Symbols 47, 48, 49, and 50 also denote similar multiplexers (MUXs). The MUX 47 selects Gdi for the conversion A and min(Rdi, Gdi, Bdi) for the conversion B. The MUX 48 selects and outputs Gdi for the conversion A and max(Rdi, Gdi, Bdi) for the conversion B. Similarly, the MUX 49 is configured so as to select and output Bdi for the conversion A and min(Rdi, Gdi, Bdi) for the conversion B. The MUX 50 is configured so as to select and output Bdi for the conversion A and max(Rdi, Gdi, Bdi) for the conversion B.

Moreover, symbol 51 denotes a circuit block, which is configured by latches consisting of stages equal to the number of pipeline stages of blocks 42, 43, and 44 and outputs HSYd05, VSYdo5, and DISPdo5 to HSYdi, VSYdi, and DISPdi serving as input synch signals in a pipeline manner after delays of clock cycles same as those of the blocks 42, 43, and 44 to make it possible to synchronize with output signals of the blocks 42, 43, and 44.

Then, the configuration of the block 42 will be described below in detail. In case of a block 53 in the block 42, it is possible to calculate an n-bit output value f in a pipeline manner synchronously with the pixel clock (PIX_CLK) for n-bit input values x and y. The output value f can be obtained from the following expression.

$$f=f_n(x, y)$$

In this case, $f_N(X, Y)$ is a core calculation function to be described later and the block 53 outputs Rw to be described later as f by inputting an output selected by the MUX 45 as x and the above adjusted value Rwm as y.

Moreover, the block 52 is configured by latches having stages equal to the number of pipeline stages of the block 53 and is configured so as to be able to synchronize with the block 53 by outputting signals having the same value to the input signal Rdi in a pipeline manner after delays of clock cycles equal to those of the block 53.

Furthermore, in case of the block 54, it is possible to obtain an n-bit output value f in a pipeline manner synchronously with the pixel clock (PIX_CLK) for n-bit input values x and y similarly to the case of the block 53. The output value f is obtained from the following, expression in accordance with the core calculation function.

$$f=f_n(2^n-1-x, y)$$

The block 54 outputs Rb to be described later as f by inputting an output selected by the MUX 46 as x and the above adjusted value Rbm as y. The number of pipeline stages of the block 54 is configured so as to be equal to the total number of pipeline stages from an input of the block 53 up to the output of the block 58. In this case, the block 58 serves as a circuit for subtracting an n-bit integer from the other n-bit integer and the block 59 serves as a circuit for adding n-bit integers each other, and an output signal Rdo to be described later can be obtained by the both circuits.

Moreover, the block 55 makes it possible to obtain an n-bit output value f for each of three n-bit input values x, y, and z in a pipeline manner synchronously with the pixel clock (PIX_CLK). The output value f is obtained from the following expression in accordance with the core calculation function.

$$f=(-1)^{SIGN(z)}f_{n-1}(\min(x, 2^n-1-y), |z|)$$

In the above expression, SIGN(X) denotes a function showing plus or minus of X, which is equal to 1 for X<0 and 0 for X≥0 and shows plus or-minus through binary digital operation and $f_N(X, Y)$ denotes a core calculation function. The block 55 outputs Rgm to be described later as f by inputting values selected by the MUX 45 and MUX 46 as x and y, and a fine-adjusted value Rgmm as z. In this case, the block 55 is configured so that the number of pipeline stages of the block 55 is equal to the total number of pipeline stages up to the output of the block 59.

The block 60 is a circuit for adding n-bit integers each other and an output Rdo3 to be described later can be obtained by the block 60.

Moreover, the block 56 makes it possible to obtain an (n−1)-bit output value f for n-bit input values x and y and (n−1)-bit input value z in a pipeline manner synchronously with the pixel clock (PIX_CLK). The output value f can be obtained by the following expression in accordance with the core calculation function if inequalities $0 \le x \le 2^{n-1}-1$ and $0 \le y \le 2^{n-1}-1$ are effectuated, $$f=(-1)^{SIGN(z)}f_{n-2}(\min(x, 2^{n-1}-1-y), |z|)$$

Or, the output value f can be obtained by the following expression if an inequality $2^{n-1} \le x \le 2^n-1$ or $2^{n-1} \le y \le 2^n-1$ is effectuated.

$$f=0$$

The block 56 is configured so as to be able to output Rgl to be described later by inputting values selected by the MUX 45 and MUX 46 as x and y, and a fine-adjusted value Rglm as z.

Furthermore, the block 57 makes it possible to obtain an (n−1)-bit output value f for n-bit input values x and y, and an (n−1)-bit input value z in a pipeline manner synchronously with the pixel clock (PIX_CLK). The output value f can be obtained by the following expression in accordance with the core calculation function if an equality $0 \le x \le 2^{n-1}-1$ or $0 \le y \le 2^{n-1}-1$ is effectuated.

$$f=0$$

Or, the output value f can be obtained by the following expression if inequalities $2^{n-1} \le x \le 2^n-1$ and $2^{n-1} \le y \le 2^n-1$ are effectuated.

$$f=(-1)^{SIGN(z)}f_{n-2}(\min(x-2^{n-1}, 2^n-1-y), |z|)$$

The block 57 can output Rgh to be described later as f by inputting values selected by the MUX 45 and MUX 46 as x and y, and a fine-adjusted value Rghm as z.

The blocks 56 and 57 are configured so that the numbers of pipeline stages of the blocks 56 and 57 are equal to the total number of pipeline stages up to the output of the block 60. Moreover, the block 61 serves as an adder for adding x, y, and z.

The circuit blocks for obtaining output Rdo5 are described above and the block 42 shows from the block 52 to the output of block 61 as one block.

In this case, the blocks 43 and 44 are configured so as to be able to output Gdo5 and Bdo5 in accordance with the same procedure as the case of the block 42 though only input signals are different.

To configure the logic diagram of this embodiment with a gate array or the like, it is possible to adjust the logic volume to a size which can be said a very simple circuit to incorporate the logic into the controller LSI 22 in FIG. 2.

A white point adjustment method which can be realized by the above hardware configuration of this embodiment is described below in detail.

Before describing the adjustment method, the core calculation function used for various types of conversions of this embodiment is described below.

As shown in FIG. 6, the core calculation function is an algorithm for obtaining a dot sequence of integers for most preferably interpolating a segment connecting a start point O(0, 0) with an end point A(L, Y) when the points are determined in a range of 0° up to 45°. That is, the function is an algorithm for obtaining Z serving as the y-coordinate of a point P which is obtained by a certain approximation in a pipeline manner after a certain clock when arbitrary X and Y are inputted, and is an art already proposed by the present applicant (Japanese Published Unexamined Patent Application No. 11-61640).

The core calculation functions $Z=f_N(X, Y)$ is defined as shown below.

(i) For arbitrary Y, the following expressions are effectuated.

$$f_N(0, Y)=0 \text{ and}$$

$$f_N(L, Y)=Y$$

(ii) For arbitrary $0 \le X < L$ and arbitrary Y, the following expression is effectuated.

$$f_N(X+1, Y)=f_N(X, Y)+0$$

Or, $$f_N(X+1, Y) = f_N(X, Y) + 1$$

(iii) For arbitrary $0 \leq Y < L$ and arbitrary X, the following expression is effectuated.

$$f_N(X, Y+1) = f_N(X, Y) + 0$$

Or, $$f_N(X, Y+1) = f_N(X, Y) + 1$$

(iv) An output Z is always obtained for arbitrary inputs X and Y after a certain clock cycle. That is, Z is outputted to inputs X and Y in a pipeline manner.

In this case, the following expressions are effectuated.

$0 \leq X \leq L$, $0 \leq Y \leq L$, X, Y: Integer $L = 2^N - 1$, $N \geq 1$, N: Integer The following expressions can be easily derived from the above Items (i), (ii), and (iii).

For arbitrary X, $f_N(X, 0) = 0$ $$f_N(X, L) = X$$

That is, from the viewpoint of graphic sense, in FIG. 6 a point P(X, Z) forms one of the monotone-increase integer lattice points starting with a point O and ending with a point A and the difference of the y-coordinate value with one right-adjacent point is 1 at most. Moreover, when Y increases by +1, increase of y-coordinate value of each point is 1 at most.

The above-described core calculation function is introduced as a function for interpolating a line segment with integers. In case of the white point conversion 1 using the above function, the value of a converted color is also clipped to any one of nearby integers and the difference of a color after converted can be only expressed in a unit which can be expressed by an integer (this is referred to as "color degeneracy").

In this case, as another embodiment of a core calculation function, it is possible to interpolate a line segment by performing more accurate calculation up to an arbitrary, decimal digits (e.g. m digits of binary decimal part). In this case, decimal parts (m bits) of final outputs Rdo5, Gdo5, and Bdo5 in FIG. 5 are also expanded to lower order. By performing FRC (Frame Rate Control) or Dither in accordance with the decimal parts and thereby increasing the apparent number of colors which can be expressed, it is possible to reduce the influence of the above color degeneracy.

Then, as for the white point adjustment in this embodiment, a case of adjusting white points by setting parameters at five achromatic color points will be described below in order to clarify the concept of the white point adjustment.

First, a conversion formula when performing approximation at two points of $GL[2^n - 1]$ serving as the maximum gray scale achromatic color and $GL[0]$ serving as the minimum gray scale achromatic color is shown below.

As described above, the input bus signals Rdi, Gdi, and, Bdi are variables showing R, G, and B values before converted. It is assumed that variables showing values after the above variables are converted only by two-point approximation are Rdo, Gdo, and Bdo. Thus, the following expression is obtained.

$0 \leq Rdi, Gdi, Bdi, Rdo, Gdo, Bdo \leq 2^n - 1$

Then, by using the above user-set parameters Rwm, Gwm, and Bwm reduced at $GL[2^n - 1]$ and the above user-set parameters Rbm, Gbm, and Bbm increased at GL[0], the following expressions are obtained.

$0 \leq Rwm + Rbm \leq 2^n - 1$ $0 \leq Gwm + Gbm \leq 2^n - 1$ $0 \leq Bwm + Bbm \leq 2^n - 1$ Moreover, when assuming that digital values approximated to R, G, and B converted values for Rdi, Gdi, and Bdi in accordance with Rwm, Gwm, Bwm, Rbm, Gbm, and Bbm designated by a user are Rw, Gw, Bw, Rb, Gb, and Bb, the conversion formulas can be shown by the following expressions.

$$Rdo = Rdi - Rw + Rb$$

$$Gdo = Gdi - Gw + Gb$$

$$Bdo = Bdi - Bw + Bb$$

In this case, the above conversion formulas for obtaining Rdo, Gdo, and Bdo for arbitrary Rdi, Gdi, and Bdi in accordance with the conversion A which is a conversion system in which three primary colors (red, green, and blue) are uniformly converted and the conversion system of the conversion B which is a conversion system in which luminance levels of three primary colors (red, green, and blue) are not influenced after adjusted can be expressed as shown below by using a core calculation function $Z = f_N(X, Y)$.

(a) Conversion A $$Rw = f_n(Rdi, Rwm), Rb = f_n(2^n - 1 - Rdi, Rbm)$$

$$Gw = f_n(Gdi, Gwm), Gb = f_n(2^n - 1 - Gdi, Gbm)$$

$$Bw = f_n(Bdi, Bwm), Bb = f_n(2^n - 1 - Bdi, Bbm)$$

These conversion formulas are obtained by moving integer lattice points on the surfaces of and inside of a cube OBMR-GCWY to integer lattice points on the surfaces of and inside of a cube O"B'M'R'-G'C'W'Y' in FIG. 7. That is, in FIG. 7, a point W(L, L, L) is moved to W' (L–Rwm, L–Gwm, L–Bwm) and a point O(0, 0, 0) is moved to O" (Rbm, Gbm, Bbm), and a line segment BM is moved to B'M', MR is moved to M'R', RY is moved to R'Y', YG is moved to Y'G', GC is moved to G'C', and CB is moved to C'B'. Moreover, achromatic input colors between minimum and maximum gray scale values are converted from colors shown by the integer lattice points on the line segment OW to colors shown by the integer lattice points nearby the line segment O"W'. In this case, L is equal to $2^n - 1$ ($n \geq 1$, n: integer).

FIG. 8 is an illustration for obtaining as a graphical image how the converted value of B DB=Bdo–Bdi_ (=–Bw+Bb) changes. In this case, it is difficult to imagine it if the graphical image is a three-dimensional space of R–G–B. Therefore, in FIG. 8, how DB changes for Rdi and Bdi is shown by ignoring G-axis and thereby decreasing the number of dimensions to two dimensions of R–B. In FIG. 8, the value of DB is shown by integer lattice points on the surface of or nearby a quadrangle DoDbDwDr. It is also possible to obtain DR=Rdo–Rdi(=–Rw+Rb) and DG=Gdo–Gdi(=–Gw+Gb) in the same sense. DB, DR, and DG expanded to three dimensions again are shown by the above expressions.

(b) Conversion B $$Rw = f_n(\min(Rdi, Gdi, Bdi), Rwm)$$

$$Rb = f_n(2^n - 1 - \max(Rdi, Gdi, Bdi), Rbm)$$

$Gw=f_n(\min(Rdi, Gdi, Bdi), Gwm)$ $Gb=f_n(2^n-1-\max(Rdi, Gdi, Bdi), Gbm)$ $Bw=f_n(\min(Rdi, Gdi, Bdi), Bwm)$ $Bb=f_n(2^n-1-\max(Rdi, Gdi, Bdi), Bbm)$ The above conversion formulas are obtained by moving lattice points on planes-of and inside of a cube OBMR-GCWY to integer lattice points almost on planes of and inside of an irregular dodecahedron enclosed by triangles W'BM, W'BC, W'GC, W'GY, W'RY, W'RM, O"BM, O"BC, O"GC, O"GY, O"RY, and O"RM. However, because conversion of integer lattice points is considered, the above lattice points are not always completely moved to the inside of the dodecahedron but a distance protruding from a plane is kept within 1. In case of the conversion B, the point W(L, L, L) is moved to W'(L-Rwm, L-Gwm, L-Bwm) and the point O(0, 0, 0) is moved to O"(Rbm, Gbm, Bbm).

However, differently from the conversion A, points on the line segments BM, MR, RY, YG, GC, and CB are not moved at all. However, achromatic input colors between minimum- and maximum-gray-scale values are converted from colors shown by the integer lattice points on the line segment OW to the colors shown by the integer lattice points near by the line segment O"W'.

FIG. 10 is an illustration for obtaining as a graphical image how the converted value of B DB=Bdo−Bdi changes, which shows how DB changes for Rdi and Bdi by ignoring G-axis and thereby decreasing the number of dimensions to two dimensions of R-B. In FIG. 10, the value of DB is; shown by integer lattice points on the surface of or nearby two triangles DoDwB and DoDwR. It is possible to obtain DR=Rdo−Rdi and DG=Gdo−Gdi with the same sense, and DB, DR, and DG expanded to three dimensions again are shown by the above expressions.

Then, a case of executing white point adjustment in intermediate gray scale achromatic colors is described below which is the most characteristic part of this embodiment.

First, a case of adding fine adjustment at $GL[2^{n-1}-1]$ is described in addition to adjustment of the above minimum, and maximum gray scale achromatic colors.

In this case, when it is assumed that variables showing R, G, and B value's after converted through two-point approximation and the third-point approximation are Rdo3, Gdo3, and Bdo3, the following expression is first obtained.

$0 £ Rdo3, Gdo3, Bdo3 £ 2^n-1$

Then, when it is assumed that the above user-set parameters added at $GL[2^{n-1}-1]$ are Rgmm, Ggmm, and Bgmm, the allowable ranges of the parameters are shown by the following expressions by considering the restriction in using the core calculation function.

$-2^{n-1}+1 £ Rgmm £ 2^{n-1}-1$ $-2^{n-1}+1 £ Ggmm £ 2^{n-1}-1$ $-2^{n-1}+1 £ Bgmm £ 2^{n-1}-1$ Moreover, when it is assumed that variables showing values to be added to Rdo, Gdo, and Bdo through the conversion caused by only the third-point approximation are Rgm, Ggm, and Bgm, conversion formulas are shown as follows:

$Rdo3=Rdo+Rgm$ $Gdo3=Gdo+Ggm$ $Bdo3=Bdo+Bgm$

In this case, the following conversion formulas for the conversions A and B are obtained by using the core calculation function $Z=f_N(X, Y)$.

(a) Conversion A $Rgm=(-1)^{SIGN(Rgmm)}f_{n-1}(\min(Rdi, 2^n-1-Rdi), |Rgmm|)$ $Ggm=(-1)^{SIGN(Ggmm)}f_{n-1}(\min(Gdi, 2^n-1-Gdi), |Ggmm|)$ $Bgm=(-1)^{SIGN(Bgmm)}f_{n-1}(\min(Bdi, 2^n-1-Bdi), |Bgmm|)$ FIG. 11 is an illustration for obtaining how Bgm; the fine-adjusted value of B changes in accordance with a graphical image. In this case, it is difficult to obtain the image of a three-dimensional space of R-G-B. Therefore, FIG. 11 shows how Bgm changes for Rdi and Bdi by ignoring G-axis and thereby, decreasing the number of dimensions to two dimensions of R-B similarly to the above described. In FIG. 11, the value of Bgm is shown by integer lattice points on the surface of or nearby three quadrangles $OM_1M_4R$, $M_1M_2M_3M_4$, and $M_2BWM_3$.

In case of the white point adjustment for the intermediate-gray-scale achromatic color, an input color is converted into a color having a different color tone by performing fine-adjustment by Bgmm when Bdi has a gray scale value of $2^{n-1}-1$ or $2^{n-1}$. As shown in FIG. 11, color conversion processing is performed so that a converted value Bgm slowly decreases from a vertex (roof-shaped vertex having a height of Bgmm) when Bdi is equal to $2^{n-1}-1$ (line $M_1M_4$) or $2^{n-1}$ (line $M_2M_3$) and it decreases to 0 when Bdi is at the minimum gray scale (Rdi axis) or maximum gray scale (line BW). Moreover, as shown in FIG. 11, it is understood that conversion is made even if the value of Rdi is minimum gray scale (Bdi axis) or maximum gray scale (line RW) and the characteristic of the conversion A is shown that three primary colors (red, green, and blue) are also uniformly, converted.

It is also possible to obtain. Rgm and Ggm through the same sense. Bgm, Rgm, and Ggm expanded to three dimensions again are shown by the above expressions.

(b) Conversion B $Rgm=(-1)^{SIGN(Rgmm)}f_{n-1}(MIN3, |Rgmm|) = (-1)^{SIGN(Rgmm)}f_{n-1}(\min(MIN, 2^n-1-MAX), |Rgmm|)$ $Ggm=(-1)^{SIGN(Ggmm)}f_{n-1}(\min(MIN, 2^n-1-MAX), |Ggmm|)$ $Bgm=(-1)^{SIGN(Bgmm)}f_{n-1}(\min(MIN, 2^n-1-MAX), |Bgmm|)$ Where,

| | | |
|---|---|---|
| MAX | = | max(Rdi, Gdi, Bdi), MIN = min(Rdi, Gdi, Bdi) |
| MIN3 | = | min(Rdi, Gdi, Bdi, $2^n$-1-Rdi, $2^n$-1-Gdi, $2^n$-1-Bdi) |
| | = | min(MIN, $2^n$-1-MAX) |

FIG. 12 is an illustration for obtaining how Bgm; the fine-adjusted value of B changes in accordance with a graphical image. In this case, it is difficult to obtain the image of a three-dimensional space of R-G-B. Therefore, FIG. 12 also shows how Bgm changes for Rdi and Bdi by ignoring G-axis and thereby decreasing the number of dimensions to two dimensions of R-B. In FIG. 12, the value of Bgm is shown by integer lattice points on the surface of or nearby five quadrangles $BM_6M_7W$, $WM_7M_8R$, $RM_8M_5O$, $OM_5M_6B$, and $M_5M_6M_7M_8$.

In case of the white point adjustment for the intermediate gray scale achromatic colors, an input color is converted into a color having a different color tone by performing fine adjustment by Bgmm when Bdi has a gray scale value of $2^{n-1}-1$ or $2^{n-1}$ and Rdi has a gray scale value of $2^{n-1}-1$ or $2^{n-1}$. From FIG. 12, it is understood that a converted value Bgm slowly decreases in four directions from a quadrangle $M_5M_6M_7M_8$ serving as a vertex (height of Bgmm) and moreover, decreases to 0 when Rdi or Bdi reaches the minimum or maximum gray scale value. That is, the feature of the conversion B is shown that luminance levels of three primary colors (red, green, and blue) are not influenced even after the white point adjustment.

Moreover, Rgm and Ggm can also be obtained in accordance with the same sense. Bgm, Rgm, and Ggm expanded to three dimensions again are shown by the above expressions.

Then, a case of adding fine adjustment at $GL[2^{n-2}-1]$ and $GL[2^{n-1}+2^{n-2}-1]$ to the above three-point approximation is described below.

In this case, when it is assumed that variables showing R, G, and B values after converted through approximations up to the fifth point are Rdo5, Gdo5, and Bdo5, the following expression is first effectuated.

$$0 \leq Rdo5, Gdo5, Bdo5 \leq 2^n-1$$

Then, when it is assumed that user-set parameters for designating values added at $GL[2^{n-2}-1]$ are Rglm, Gglm, and Bglm as further-fine-adjusted values from Rdo3, Gdo3, and Bdo3 for approximation of the fourth point and user-set parameters for designating values added at $GL[2^{n-1}+2^{n-2}-1]$, are Rghm, Gghm, and Bghm as further-fine-adjusted values, from Rdo3, Gdo3, and Bdo3 for approximation of the fifth point, their allowable ranges are shown by the following expressions by considering the restriction in using the core calculation function.

$$-2^{n-2}+1 \leq Rglm \leq 2^{n-2}-1$$
$$-2^{n-2}+1 \leq Gglm \leq 2^{n-2}-1$$
$$-2^{n-2}+1 \leq Bglm \leq 2^{n-2}-1$$
$$-2^{n-2}+1 \leq Rghm \leq 2^{n-2}-1$$
$$-2^{n-2}+1 \leq Gghm \leq 2^{n-2}-1$$
$$-2^{n-2}+1 \leq Bghm \leq 2^{n-2}-1$$

Moreover, when it is assumed that as values added to Rdo3, Gdo3 and Bdo3 values due to conversion caused by only the approximation of the fourth point are Rgl, Ggl, and Bgl and values due to conversion caused by only the approximation of the fifth point are Rgh, Ggh, and Bgh, the following conversion formulas are effectuated.

$$Rdo5 = Rdo3 + Rgl + Rgh$$
$$Gdo5 = Gdo3 + Ggl + Ggh$$
$$Bdo5 = Bdo3 + Bgl + Bgh$$

Conversion formulas for the conversions A and B in the above case are expressed as shown below by using the core calculation function $Z = f_N(X, Y)$.

(a) Conversion A

<1> If $0 \leq Rdi \leq 2^{n-1}-1$ is effectuated, then the following expressions are obtained.

$$Rgl = (-1)^{SIGN(Rglm)} f_{n-2}(\min(Rdi, 2^{n-1}-1-Rdi), |Rglm|)$$

$$Rgh = 0$$

Or, if $2^{n-1} \leq Rdi \leq 2^n-1$ is effectuated, then the following expressions are obtained.

$$Rgl = 0$$

$$Rgh = (-1)^{SIGN(Rghm)} f_{n-2}(\min(Rdi-2^{n-1}, 2^n-1-Rdi), |Rghm|)$$

<2> If $0 \leq Gdi \leq 2^{n-1}-1$ is effectuated, then the following expressions are obtained.

$$Ggl = (-1)^{SIGN(Gglm)} f_{n-2}(\min(Gdi, 2^{n-1}-1-Gdi), |Gglm|)$$

$$Ggh = 0$$

Or, if $2^{n-1} \leq Gdi \leq 2^n-1$ is effectuated, then the following expressions are obtained.

$$Ggl = 0$$

$$Ggh = (-1)^{SIGN(Gghm)} f_{n-2}(\min(Gdi-2^{n-1}, 2^n-1-Gdi), |Gghm|)$$

<3> If $0 \leq Bdi \leq 2^{n-1}-1$ is effectuated, then the following expressions are obtained.

$$Bgl = (-1)^{SIGN(Bglm)} f_{n-2}(\min(Bdi, 2^{n-1}-1-Bdi), |Bglm|)$$

$$Bgh = 0$$

Or, if $2^{n-1} \leq Bdi \leq 2^n-1$ is effectuated, then the following expressions are obtained.

$$Bgl = 0$$

$$Bgh = (-1)^{SIGN(Bghm)} f_{n-2}(\min(Bdi-2^{n-1}, 2^n-1-Bdi), |Bghm|)$$

FIGS. 13(a) and 13(b) are illustrations for obtaining as graphical images how Bgl and Bgh; fine-adjusted values of B change. In this case, it is difficult to obtain the image of a three-dimensional space of R-G-B. Therefore, FIG. 13(a) shows how Bgl changes for Rdi and Bdi, and FIG. 13(b) shows how Bgh changes for Rdi and Bdi by ignoring G-axis and thereby decreasing the number of dimensions to two dimensions of R-B similarly to the case of the above-described example.

FIG. 13(a) shows a state in which Bglm has a negative value. In case of this embodiment, the value of Bgl is shown by integer lattice points on the surface of or nearby four quadrangles $OS_1S_4R$, $S_1S_2S_3S_4$, $S_2S_3S_6S_5$, and $S_5BWS_6$.

In case of the white point adjustment for the intermediate gray scale achromatic colors, when Bdi has a gray scale value of $2^{n-2}-1$ or $2^{n-2}$, an input color is converted into a color having a different color tone by performing fine adjustment by Bglm. As shown in FIG. 13(a), color conversion processing is performed so that a converted value (absolute value) Bgl slowly decreases from $2^{n-2}-1$ (line segment $S_1S_4$) and $2^{n-2}$ (line segment $S_2S_3$) of Bdi serving as a vertex (height of Bglm) and decreases to 0 when Bdi has the minimum gray scale (Rdi axis) or Bdi is $2^{n-1}-1$ or more. That is, it is understood that conversion is made through fine adjustment by Bglm even if Rdi has the maximum gray scale value or minimum gray scale value and therefore, the feature of the conversion A is shown.

Rgl and Ggl can be similarly expressed. Rgl, Ggl, and Bgl expanded to three dimensions again are shown by the above expressions.

In this case, multiple-point approximation of the ; conversion A represented by FIG. 13(a) is shown by a general expression. When k is assumed as an integer kept in a range of $1 \leq k < n$, it is understood that a gray scale value of Bdi to be fine-adjusted becomes $2^{n-k}-1$ or $2^{n-k}$, an input color is converted into a color having a different, color tone through the above fine adjustment when Bdi has this gray scale value, converted values of colors other than the input color slowly decrease, and a converted value is decreased to 0 for input colors in which the value of Bdi is equal to the minimum gray scale value or the gray scale level of $2^{n-k+1}$ or more. That is, as clarified from the above general expression, though FIG. 13(a) shows approximation of the fourth point, it is possible to adjust at achromatic points such as the sixth point or tenth point if the point has a gray scale level specified in powers of 2 and apply color conversion processing according to the conversion A. Thereby, it is possible to perform the white point adjustment at a low-gray-scale part by a simple circuit and effectively correspond to a problem such as a blue shift in an LCD monitor.

Moreover, FIG. 13(b) shows a case of using a positive value as the value of Bghm. The value of Bgh is shown by integer lattice points on the surface of or nearby four quadrangles $BL_1L_4W$, $L_1L_2L_3L_4$, $L_2L_3L_6L_5$, and $L_5ORL_6$.

(b) Conversion B

<1> If $0 \leq max(Rdi, Gdi, Bdi) \leq 2^{n-1}-1$ is effectuated, then the following expression is obtained.

$$Rgl=(-1)^{SIGN(Rglm)}f_{n-2}(MIN4, |Rglm|)=(-1)^{SIGN(Rglm)}f_{n-2}(min(MIN, 2^{n-1}-1-MAX), |Rglm|)$$

Or, if $2^{n-1} \leq max(Rdi, Gdi, Bdi) \leq 2^n-1$ is effectuated, then the following expression is obtained.

$$Rgl=0$$

If $0 \leq min(Rdi, Gdi, Bdi) \leq 2^{n-1}-1$ is effectuated, then the following expression is obtained.

$$Rgh=0$$

Or, if $2^{n-1} \leq min(Rdi, Gdi, Bdi) \leq 2^n-1$ is effectuated, then the following expression is obtained.

$$Rgh=(-1)^{SIGN(Rghm)}f_{n-2}(MIN5, |Rghm|)=(-1)^{SIGN(Rghm)}f_{n-2}(min(MIN-2^{n-1}, 2^n-1-MAX) |Rghm|)$$

<2> If $0 \leq max(Rdi, Gdi, Bdi) \leq 2^{n-1}-1$ is effectuated, then the following expression is obtained.

$$Ggl=(-1)^{SIGN(Gglm)}f_{n-2}(min(MIN, 2^{n-1}-1-MAX), |Gglm|)$$

Or, if $2^{n-1} \leq max(Rdi, Gdi, Bdi) \leq 2^n-1$ is effectuated, then the following expression is obtained.

$$Ggl=0$$

If $0 \leq min(Rdi, Gdi, Bdi) \leq 2^{n-1}-1$ is effectuated, then the following expression is obtained.

$$Ggh=0$$

Or, if $2^{n-1} \leq min(Rdi, Gdi, Bdi) \leq 2^n-1$ is effectuated, then the following expression is obtained.

$$Ggh=(-1)^{SIGN(Gghm)}f_{n-2}(min(MIN-2^{n-1}, 2^n-1-MAX) |Gghm|)$$

<3> If $0 \leq max(Rdi, Gdi, Bdi) \leq 2^{n-1}-1$ is effectuated, then the following expression is obtained.

$$Bgl=(-1)^{SIGN(Bglm)}f_{n-2}(min(MIN, 2^{n-1}-1-MAX), |Bglm|)$$

Or, if $2^{n-1} \leq max(Rdi, Gdi, Bdi) \leq 2^n-1$ is effectuated, then the following expression is obtained.

$$Bgl=0$$

If $0 \leq min(Rdi, Gdi, Bdi) \leq 2^{n-1}-1$ is effectuated, then the following expression is obtained.

$$Bgh=0$$

Or, if $2^{n-1} \leq min(Rdi, Gdi, Bdi) \leq 2^n-1$ is effectuated, then the following expression is obtained.

$$Bgh=(-1)^{SIGN(Bghm)}f_{n-2}(min(MIN-2^{n-1}, 2^n-1-MAX), |Bghm|)$$

Where, $$MIN4=min(Rdi, Gdi, Bdi, 2^{n-1}-1-Rdi, 2^{n-1}-1-Gdi, 2^{n-1}-1-Bdi)=min(MIN, 2^{n-1}-1-MAX)$$

$$MIN5=min(Rdi-2^{n-1}, Gdi-2^{n-1}, Bdi-2^{n-1}, 2^n-1-Rdi, 2^n-1-Gdi, 2^n-1-Bdi)=min(MIN-2^{n-1}, 2^n-1-MAX)$$

FIGS. 14(a) and 14(b) are illustrations for obtaining as graphical images how Bgl and Bgh; fine-adjusted values of B change. In this case, it is difficult to obtain the image of a three-dimensional space of R-G-B. Therefore, FIG. 14(a) shows how Bgl changes for Rdi and Bdi, and FIG. 14(b) shows how Bgh changes for Rdi and Bdi by ignoring G-axis and thereby decreasing the number of dimensions to two dimensions of R-B.

FIG. 14(a) shows a state in which a negative value is used as the value of Bglm. The value of Bgl is shown by integer lattice points on the surface of or nearby six quadrangles $OS_7S_{10}S_{13}$, $S_{11}S_8S_7O$, $S12S_9S_8S_{11}$, $S_{13}S_{10}S_9S_{12}$, and $S_7S_8S_9S_{10}$ and a concave hexagon $BWRS_{13}S_{12}S_{11}$. Bglm expanded to three dimensions again is shown by the above expressions.

In case of the white point adjustment for the intermediate-gray-scale achromatic colors, an input color is converted into a color having a different color tone by performing fine adjustment by Bglm when Bdi is $2^{n-2}-1$ or $2^{n-2}$ and Rdi is $2^{n-2}-1$ or $2^{n-2}$. Color conversion processing is made so that a converted value (absolute value) Bgl slowly decreases from the quadrangle $S_7S_8S_9S_{10}$ serving as a vertex and moreover decreases to 0 when Bdi is the minimum gray scale (Rdi axis) or $2^{n-1}-1$ or more, or Rdi is the minimum gray scale (Bdi axis) or $2^{n-1}-1$ or more. That is, the feature of the conversion B is shown that luminance levels of three primary colors (red, green, and blue) are not influenced even if fine adjustment by Bglm is made.

In this case, multiple-point approximation of the conversion B represented by FIG. 14(a) is shown by a general expression. When k is assumed as an integer kept in a range of $1 \leq k < n$, a gray scale value to which fine adjustment is applied becomes $2^{n-k}-1$ or $2^{n-k}$ and an input color are converted into color having a different color tone through the fine adjustment when Bdi and Rdi have this gray scale value. Moreover, colors other than the input color slowly decrease their converted values and a converted value decreases to 0 for an input color in which the value of any of Bdi and Rdi is the minimum gray scale value or the gray scale level of $2^{n-k+1}-1$ or more. That is, in addition to fourth-point approximation, achromatic points of the sixth point or tenth point can be adjusted if they have a gray scale level specified in powers of 2 and color conversion processing can be similarly applied to the achromatic points in accordance with the conversion B.

Moreover, FIG. 14(b) shows an example in which a positive value is used as the value of Bghm. The value of Bgh is shown by integer lattice points on the surface of or nearby five quadrangles $WL_7L_{10}L_{13}$, $L_{11}L_8L_7W$, $L_{12}L_9L_8L_{11}$, $L_{13}L_{10}L_9L_{12}$, and $L_7L_8L_9L_{10}$ and a concave hexagon $ROBL_{13}L_{12}L_{11}$. Bghm expanded to three dimension again is shown by the above expression.

Then, expressions for expressing variables Rdo5, Gdo5, and Bdo5 showing values after converted in accordance with five-point approximation are described below when including the algorithms described above and the adjusted values Rwm, Gwm, and Bwm at $GL[2^n-1]$, adjusted values Rbm, Gbm, and Bbm at $GL[0]$, adjusted values Rgmm, Ggmm, Bgmm at $GL[2^{n-1}-1]$ obtained through third-point approximation, adjusted values Rglm, Gglm, and Bglm at $GL[2^{n-2}-1]$ obtained through fourth-point approximation, and adjusted values Rghm, Gghm and Bghm at $GL[2^{n-1}+2^{n-2}-1]$ obtained through fifth-point approximation.

Where, $$0 \pounds Rwm+Rbm, Gwm+Gbm, Bwm+Bbm \pounds 2^n-1$$

$$-2^{n-1}+1 \pounds Rgmm, Ggmm, Bgmm \pounds 2^{n-1}-1$$

$$-2^{n-2}+1 \pounds Rglm, Gglm, Bglm \pounds 2^{n-2}-1$$

$$-2^{n-2}+1 \pounds Rghm, Gghm, Bghm \pounds 2^{n-2}-1$$

(a) Conversion A

<1> If $0 \pounds Rdi \pounds 2^{n-1}-1$ is effectuated, then the following expression is obtained.

$$Rdo5=Rdo+Rgm+Rgl+Rgh=Rdi-Rw+Rb+Rgm+Rgl+Rgh=Rdi-f_n(Rdi, Rwm)+f_n(2^n-1-Rdi, Rbm)$$

$$+(-1)^{SIGN(Rgmm)}f_{n-1}(Rdi, |Rgmm|)+(-1)^{SIGN(Rglm)}f_{n-2}(\min(Rdi, 2^{n-1}-1-Rdi), |Rglm|)$$

Or, if $2^{n-1} \pounds Rdi \pounds 2^n-1$ is effectuated, then the following expression is obtained.

$$Rdo5=Rdo+Rgm+Rgl+Rgh=Rdi-Rw+Rb+Rgm+Rgl+Rgh=Rdi-f_n(Rdi, Rwm)+f_n(2^n-1-Rdi, Rbm)$$

$$+(-1)^{SIGN(Rgmm)}f_{n-1}(2^n-1-Rdi, |Rgmm|)+(-1)^{SIGN(Rglm)}f_{n-2}(\min(Rdi-2^{n-1}, 2^n-1-Rdi), |Rghm|)$$

<2> Similarly if $0 \pounds Gdi \pounds 2^{n-1}-1$ is effectuated, then the following expression is obtained.

$$Gdo5=Gdi-f_n(Gdi, Gwm)+f_n(2^n-1-Gdi, Gbm)+(-1)^{SIGN(Ggmm)}f_{n-1}(Gdi, |Ggmm|)+(-1)^{SIGN(Gglm)}f_{n-2}(\min(Gdi, 2^{n-1}-1-Gdi), |Gglm|)$$

Or, if $2^{n-1} \pounds Gdi \pounds 2^n-1$ is effectuated, then the following expression is obtained.

$$Gdo5=Gdi-f_n(Gdi, Gwm)+f_n(2^n-1-Gdi, Gbm)+(-1)^{SIGN(Ggmm)}f_{n-1}(2^n-1-Gdi, |Ggmm|)+(-1)^{SIGN(Gglm)}f_{n-2}(\min(Gdi-2^{n-1}, 2^n-1-Gdi), |Gghm|)$$

<3> If $0 \pounds Bdi \pounds 2^{n-1}-1$ is effectuated, then the following expression is obtained.

$$Bdo5=Bdi-f_n(Bdi, Bwm)+f_n(2^n-1-Bdi, Bbm)+(-1)^{SIGN(Bgmm)}f_{n-1}(Bdi, |Bgmm|)+(-1)^{SIGN(Bglm)}f_{n-2}(\min(Bdi, 2^{n-1}-1-Bdi), |Bglm|)$$

Or, if $2^{n-1} \pounds Bdi \pounds 2^n-1$ is effectuated, then the following expression is obtained.

$$Bdo5=Bdi-f_n(Bdi, Bwm)+f_n(2^n-1-Bdi, Bbm)+(-1)^{SIGN(Bgmm)}f_{n-1}(2^n-1Bdi, |Bgmm|)+(-1)^{SIGN(Bglm)}f_{n-2}(\min(Bdi-2^{n-1}, 2^n-1-Bdi), |Bghm|)$$

In this case, when obtained Rdo5 is larger than $2^n-1$, it is set to $2^n-1$. When obtained Rdo5 is smaller than 0, it is set to 0.

The same type of formulas are true for Gdo5 and Bdo5.

From the above expressions, it is possible to obtain variables for the conversion A showing values after converted through five-point approximation by using the core calculation function $Z=f_N(X, Y)$.

(b) Conversion B

<1> If $0 \pounds \max(Rdi, Gdi, Bdi) \pounds 2^{n-1}-1$ is effectuated, then the following expression is obtained.

$$Rdo5=Rdo+Rgm+Rgl+Rgh=Rdi-Rw+Rb+Rgm+Rgl+Rgh=Rdi-f_n(MIN, Rwm)+f_n(2^n-1-MAX, Rbm)$$

$$+(-1)^{SIGN(Rgmm)}f_{n-1}(\min(MIN, 2^n-1-MAX), |Rgmm|)+(-1)^{SIGN(Rglm)}f_{n-2}(\min(MIN, 2^{n-1}-1-MAX), |Rglm|)$$

$$Gdo5=Gdi-f_n(MIN, Gwm)+f_n(2-1-MAX, Gbm)+(-1)^{SIGN(Ggmm)}f_{n-1}(\min(MIN, 2^n-1-MAX), |Ggmm|)+(-1)^{SIGN(Gglm)}f_{n-2}(\min(MIN, 2^{n-1}-1-MAX), |Gglm|)$$

$$Bdo5=Bdi-f_n(MIN, Bwm)+f_n(2^n-1-MAX, Bbm)+(-1)^{SIGN(Bgmm)}f_{n-1}(\min(MIN, 2^n-1-MAX), |Bgmm|)+(-1)^{SIGN(Bglm)}f_{n-2}(\min(MIN, 2^{n-1}-1-MAX), |Bglm|)$$

<2> Or, if $2^{n-1} \pounds \min(Rdi, Gdi, Bdi) \pounds 2^n-1$ is effectuated, then the following expression is obtained.

$$Rdo5=Rdi-f_n(MIN, Rwm)+f_n(2^n-1-MAX, Rbm)+(-1)^{SIGN(Rgmm)}f_{n-1}(\min(MIN, 2^n-1-MAX), |Rgmm|)+(-1)^{SIGN(Rglm)}f_{n-2}(\min(MIN-2^{n-1}, 2^n-1-MAX), |Rghm|)$$

$$Gdo5=Gdi-f_n(MIN, Gwm)+f_n(2^n-1-MAX, Gbm)+(-1)^{SIGN(Ggmm)}f_{n-1}(\min(MIN, 2^n-1-MAX), |Ggmm|)+(-1)^{SIGN(Gghm)}f_{n-2}(\min(MIN-2^{n-1}, 2^n-1-MAX), |Gghm|)$$

$$Bdo5=Bdi-f_n(MIN, Bwm)+f_n(2^n-1-MAX, Bbm)+(-1)^{SIGN(Bgmm)}f_{n-1}(\min(MIN, 2^n-1-MAX), |Bgmm|)+(-1)^{SIGN(Bghm)}f_{n-2}(\min(MIN-2^{n-1}, 2^n-1-MAX), |Bghm|)$$

<3> Or, if Rdi, Gdi, and Bdi are shown by expressions other than the above ones, then the following expressions are obtained.

$$Rdo5=Rdi-f_n(MIN, Rwm)+f_n(2^n-1-MAX, Rbm)+(-1)^{SIGN(Rgmm)}f_{n-1}(\min(MIN, 2^n-1-MAX), |Rghm|)$$

$$Gdo5=Gdi-f_n(MIN, Gwm)+f_n(2^n-1-MAX, Gbm)+(-1)^{SIGN(Ggmm)}f_{n-1}(\min(MIN, 2^n-1-MAX), |Gghm|)$$

$$Bdo5=Bdi-f_n(MIN, Bwm)+f_n(2^n-1-MAX, Bbm)+(-1)^{SIGN(Bgmm)}f_{n-1}(\min(MIN, 2^n-1-MAX), |Bgmm|)$$

Where, $$MAX=\max(Rdi, Gdi, Bdi)$$

$$MIN=\min(Rdi, Gdi, Bdi)$$

In this case, when obtained Rdo5 is larger than $2^n-1$, it is set to $2^n-1$. When obtained Rdo5 is smaller than 0, it is set to 0.

The same type of formulas are true for Gdo5 and Bdo5.

From the above expressions, it is possible to obtain variables for the conversion B showing values after converted through five-point approximation by using the core calculation function. $Z=f_N(X, Y)$ Thus, according to this embodiment, it is possible to apply the white point adjustment according to the core calculation function to an achromatic color whose gray scale value is between maximum-gray-scale GL[$2^n-1$] and minimum-gray-scale GL[0]. Moreover, according to this embodiment, it is possible to output a white-point-adjusted output value in a pipeline manner by hardware configuration without using a look-up table. Therefore, it is possible to realize proper white point adjustment with a simple configuration without greatly increasing hardware configuration in size. Moreover, it is possible to provide a more-proper apparatus adapted to the sense of a user by adding white point adjustment for maximum- and minimum-gray-scale achromatic colors in addition to adjustment for intermediate gray scale achromatic colors.

Furthermore, according to this embodiment, it is possible to prepare algorithms corresponding to conversion systems of the conversions A and B, output them by simply changing them in accordance with a request, and obtain an image output corresponding to the type of image.

As described above, according to the present invention, it is possible to embody high-accuracy white point adjustment with a simple circuit configuration according to an efficient algorithm in a color display system for full digital processing.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A color image processing method comprising the steps of:
   converting an intermediate gray scale input color serving as an achromatic color located between maximum- and minimum-gray-scale achromatic colors into a color having a different color tone in accordance with set converted values and slowly decreasing a converted value for input colors other than the intermediate gray scale input color; and
   decreasing the converted value to 0 for an input color in which the value of each color signal configuring the input color is equal to the minimum gray scale value or maximum gray scale value.

2. The color image processing method according to claim 1, wherein an input color serving as a maximum-gray-scale achromatic color is converted into a color having a different color tone in accordance with a set maximum-gray-scale converted value, a converted value is slowly decreased for input colors other than the input color, and the converted value is decreased to 0 for an input color in which the value of each color signal configuring the input color is equal to the minimum gray scale value, and
   an input color serving as a minimum-gray-scale achromatic color is converted into a color having a different color tone in accordance with a set minimum-gray-scale converted value, a converted value is slowly decreased for input colors other than the input color, and the converted value is decreased to 0 for an input color in which the value of each color signal configuring the input color is equal to the maximum gray scale value.

3. A color image processing method comprising the steps of:
   converting an intermediate gray scale input color serving as an achromatic color located between maximum- and minimum-gray-scale achromatic colors into a color having a different color tone in accordance with set converted values and slowly decreasing a converted value for input colors other than the intermediate gray scale input color; and
   decreasing the converted value to 0 for an input color in which the value of any one of color signals configuring the input color is equal to the minimum gray scale value or maximum gray scale value.

4. The color image processing method according to claim 3, wherein
   an input color serving as a maximum-gray-scale achromatic color is converted into a color having a different color tone in accordance with a set maximum-gray-scale converted value, a converted value is slowly decreased for input colors other than the input color, and the converted value is decreased to 0 for an input color in which the value of any one of color signals configuring the input color is equal to the minimum gray scale value, and
   an input color serving as a minimum-gray-scale achromatic color is converted into a color having a different color tone in accordance with a set minimum-gray-scale converted value, a converted value is slowly decreased for input colors other than the input color, and the converted value is decreased to 0 for an input color in which the value of any one of color signals configuring the input color is equal to the maximum gray scale value.

5. A color image processing apparatus for applying white point adjustment to input colors in which each color signal is configured by n bits (n is a natural number equal to or larger than 2) comprising:
   converted-value input means for inputting a converted value for an achromatic input color whose gray scale level is equal to $2^{n-k}$ or $2^{n-k}-1$ (k is an integer meeting a range of 1£k<n); and
   conversion means for converting achromatic input colors whose gray scale levels are equal to $2^{n-k}$ and $2^{n-k}-1$ respectively into colors having different color tones in accordance with a converted value input by the converted-value input means, slowly decreasing a converted value for input colors other than the input colors having the achromatic color gray scale levels of $2^{n-k}$ and $2^{n-k}-1$, and decreasing a converted value to 0 for an input color in which the value of each color signal configuring the input color is equal to the minimum gray scale value or an input color in which the gray scale level of its color signal is equal to or more than $2^{n-k+1}-1$.

6. A color image processing apparatus for applying white point adjustment to input colors in which each color signal is configured by n bits (n is a natural number equal to or larger than 2) comprising:
   converted-value input means for inputting a converted value for an achromatic input color whose gray scale level is equal to $2^{n-k}$ or $2^{n-k}-1$ (k is an integer meeting a range of 1£k<n); and
   conversion means for converting achromatic input colors whose gray scale levels are equal to $2^{n-k}$ and $2^{n-k}-1$ respectively into colors having different color tones in accordance with a converted value input by the converted-value input means, slowly decreasing a converted value for input colors other than the input colors having the achromatic color gray scale levels of $2^{n-k}$ and $2^{n-k}-1$, and decreasing a converted value to 0 for an input color in which the value of any one of color signals configuring the input color is equal to the minimum gray scale value or an input color in which the gray scale level of its color signal is equal to or more than $2^{n-k+1}-1$.

7. A color image processing apparatus for applying color conversion to a digital video interface for inputting a digital video signal output from a host system and a digital video signal input through the digital video interface without using a look-up table, the apparatus comprising:

means for determining an approximate adjustment value at a point on a gray scale, located between minimum and maximum values of the gray scale;

adjusted-value input means for inputting the adjustment value to apply white point adjustment to achromatic colors ranging from the maximum-gray-scale achromatic color to the minimum-gray-scale achromatic color; and output means for computing a digital video signal input by the digital video interface so as to converge chromaticity coordinates in achromatic colors in accordance with adjusted value inputs by the adjusted-value input means and outputting a computed digital value in a pipeline manner.

8. The color image processing apparatus according to claim 7, wherein the adjusted-value input means inputs adjusted values/an adjusted value at the point of the maximum-gray-scale achromatic color and/or minimum-gray-scale achromatic color.

9. A color image processing apparatus for applying color conversion to a digital video interface for inputting a digital video signal output from a host system and a digital video signal input through the digital video interface without using a look-up table, the apparatus comprising:

means for determining an approximate adjustment value at a point on a gray scale, located between minimum and maximum values of the gray scale;

adjusted-value input means for inputting adjusted values determined approximately at predetermined points to apply white point adjustment to achromatic colors ranging from the maximum-gray-scale achromatic color to the minimum-gray-scale achromatic color; and output means for computing a digital video signal input by the digital video interface so as to converge chromaticity coordinates in achromatic colors in accordance with adjusted value inputs by the adjusted-value input means and outputting a computed digital value in a pipeline manner; and wherein the adjusted-value input means inputs an adjusted value at an achromatic-color point having a gray scale level specified in powers of 2 between maximum- and minimum-gray-scale achromatic colors.

10. A liquid-crystal display for displaying an image in accordance with a digital video interface for inputting a digital video signal output from a host system and a digital video signal input by the digital video interface, the display comprising:

means for determining an approximate adjustment value at a point on a gray scale, located between minimum and maximum values of the gray scale;

adjusted-value input means for inputting the adjustment value for white point adjustment to a digital video signal input by the digital video interface;

a controller for computing a digital video signal input by the digital video interface so as to converge chromaticity coordinates in achromatic colors without using a look-up table and outputting a computed digital value in a pipeline manner; and a liquid-crystal display section for displaying an image in accordance with a digital value output from the controller.

11. The liquid-crystal display according to claim 10, wherein the adjusted-value input means inputs adjusted values for the white point adjustment at achromatic colors of a plurality of gray scale levels, and the controller outputs a result computed so as to adjust a blue shift in a low-gray-scale achromatic color in accordance with an adjusted value input by the adjusted-value input means.

12. The liquid-crystal display according to claim 11, wherein adjusted values for white point adjustment at a plurality of achromatic-colors inputted by the adjusted-value input means include for the achromatic colors of intermediate-gray-scale levels between maximum- and minimum-gray-scale achromatic colors.

* * * * *

UNITED STATES PATENT AND TRADEMARK OFFICE
CERTIFICATE OF CORRECTION

PATENT NO.   : 6,809,714 B1
DATED        : October 26, 2004
INVENTOR(S)  : Kazushi Yamauchi et al.

It is certified that error appears in the above-identified patent and that said Letters Patent is hereby corrected as shown below:

Column 3,
Line 61, "embody;" should read -- embody --

Column 5,
Line 53, "bye" should read -- by --

Column 6,
Line 1, "$2^{n-k+1}$-1 According" should read -- $2^{n-k+1}$-1. According --

Column 10,
Line 37, "(MUXS)" should read -- (MUXs) --

Column 12,
Line 21, "57can" should read -- 57 can --

Column 13,
Line 18, "from the;" should read -- from the --

Column 18,
Line 65, "the;" should read -- the --

Column 22,
Line 65, "function. $Z=^{f}_{N}(X, Y)$" should read -- function $Z^{f}_{N}(X, Y)$. --

Signed and Sealed this

Twenty-first Day of June, 2005

JON W. DUDAS
*Director of the United States Patent and Trademark Office*